United States Patent
Yang et al.

(10) Patent No.: US 10,648,917 B2
(45) Date of Patent: May 12, 2020

(54) LUMINESCENT COMPOSITIONS AND APPLICATIONS THEREOF

(71) Applicant: THE PENN STATE RESEARCH FOUNDATION, University Park, PA (US)

(72) Inventors: Jian Yang, State College, PA (US); Jimin Peter Kim, State College, PA (US); Zhiwei Xie, State College, PA (US)

(73) Assignee: THE PENN STATE RESEARCH FOUNDATION, University Park, PA (US)

(*) Notice: Subject to any disclaimer, the term of this patent is extended or adjusted under 35 U.S.C. 154(b) by 264 days.

(21) Appl. No.: 15/564,561

(22) PCT Filed: Apr. 6, 2016

(86) PCT No.: PCT/US2016/026180
§ 371 (c)(1),
(2) Date: Oct. 5, 2017

(87) PCT Pub. No.: WO2016/164437
PCT Pub. Date: Oct. 13, 2016

(65) Prior Publication Data
US 2018/0088053 A1   Mar. 29, 2018

Related U.S. Application Data

(60) Provisional application No. 62/238,962, filed on Oct. 8, 2015, provisional application No. 62/143,334, filed on Apr. 6, 2015.

(51) Int. Cl.
| | | |
|---|---|---|
| *G01N 21/77* | (2006.01) | |
| *G01N 21/64* | (2006.01) | |
| *G01N 31/16* | (2006.01) | |
| *G01N 31/22* | (2006.01) | |
| *C08G 18/73* | (2006.01) | |
| *C09B 57/00* | (2006.01) | |
| *C09B 69/10* | (2006.01) | |
| *C09K 11/06* | (2006.01) | |

(52) U.S. Cl.
CPC ............ *G01N 21/77* (2013.01); *C08G 18/73* (2013.01); *C09B 57/00* (2013.01); *C09B 69/109* (2013.01); *C09K 11/06* (2013.01); *G01N 21/64* (2013.01); *G01N 21/6428* (2013.01); *G01N 31/16* (2013.01); *G01N 31/221* (2013.01); *C09K 2211/1018* (2013.01); *C09K 2211/1466* (2013.01); *C09K 2211/1483* (2013.01); *G01N 2021/6432* (2013.01); *G01N 2021/7786* (2013.01); *Y10T 436/145555* (2015.01); *Y10T 436/173845* (2015.01); *Y10T 436/19* (2015.01)

(58) Field of Classification Search
CPC ....... C08G 18/73; C09B 57/00; C09B 69/109; C09K 11/06; C09K 2211/1018; C09K 2211/1466; C09K 2211/1483; G01N 2021/6432; G01N 2021/7786; G01N 21/64; G01N 21/6428; G01N 21/77; G01N 31/16; G01N 31/221; Y10T 436/145555; Y10T 436/17; Y10T 436/173845; Y10T 436/18; Y10T 436/19; Y10T 436/203332; Y10T 436/204165
USPC .......... 436/96, 106, 111, 119, 124, 131, 132, 436/163, 164, 166, 172; 422/82.05, 82.08
See application file for complete search history.

(56) References Cited

U.S. PATENT DOCUMENTS

| | | | |
|---|---|---|---|
| 9,840,583 B2* | 12/2017 | Yang | .................... C08G 63/914 |
| 2017/0080125 A1* | 3/2017 | Yang | .................... A61L 27/3608 |
| 2019/0282713 A1* | 9/2019 | Yang | .................... A61K 49/0054 |

FOREIGN PATENT DOCUMENTS

| | | | |
|---|---|---|---|
| WO | 2009/155450 | * | 12/2009 |
| WO | 2009155450 A2 | | 12/2009 |
| WO | 2014185853 A1 | | 11/2014 |

OTHER PUBLICATIONS

Xie et al. Acta Biomaterialia, vol. 50, pp. 361-369, Jan. 6, 2017.*

(Continued)

*Primary Examiner* — Maureen Wallenhorst
(74) *Attorney, Agent, or Firm* — Christopher S. Dodson; Nexsen Pruet, PLLC

(57) ABSTRACT

In one aspect, methods of sensing are described herein. In some embodiments, a method of sensing includes disposing a fluorophore in a biological environment, wherein the fluorophore includes a dioxo-pyridine ring (DPR) or a thiazolopyridine acid (TPA). The method further includes exposing the biological environment to electromagnetic radiation having a wavelength corresponding to an excitation wavelength of the fluorophore, detecting light emitted by the fluorophore, and correlating the light emitted by the fluorophore to a presence or absence of an analyte within the biological environment in an amount above a minimum detection threshold. The presence of the analyte can increase or decrease the amount of light emitted by the fluorophore. The presence of the analyte may also shift the peak emission wavelength or alter the fluorescence lifetime of the fluorophore. The analyte, in some embodiments, includes hydrogen ions, halide ions, and/or halogens.

17 Claims, 23 Drawing Sheets

(56) References Cited

OTHER PUBLICATIONS

Chorell et al, "Mapping pilicide anti-virulence effect in *Escherichia coli*, a comprehensive structure-activity study", Bioorganic & Medicinal Chemistry, Jan. 25, 2012, pp. 3128-3142, vol. 20, No. 9.
International Search Report and Written Opinion issued in corresponding International Application No. PCT/US2016/026180 dated Jul. 14, 2016, 14 pages.

* cited by examiner

CA-Cys

CA-CYSTEAMINE

CA-HOMOCYSTEINE

CA-PENICILLAMINE

US 10,648,917 B2

LUMINESCENT COMPOSITIONS AND APPLICATIONS THEREOF

CROSS REFERENCE TO RELATED APPLICATIONS

This application is a U.S. national stage application under 35 U.S.C. § 371 of International Application No. PCT/US2016/026180, filed on Apr. 6, 2016, which claims priority pursuant to 35 U.S.C. § 119(e) to U.S. Provisional Patent Application Ser. No. 62/143,334, filed on Apr. 6, 2015, and to U.S. Provisional Patent Application Ser. No. 62/238,962, filed on Oct. 8, 2015, each of which is hereby incorporated by reference in its entirety.

STATEMENT REGARDING FEDERALLY SPONSORED RESEARCH

This invention was made with government support under Grant No. EB012575, awarded by the National Institutes of Health and Grant No. DMR1313553, awarded by the National Science Foundation. The Government has certain rights in the invention.

FIELD

This invention relates to luminescent compositions and, in particular, to citric acid-derived luminescent compositions for imaging and sensing applications.

BACKGROUND

Fluorescence imaging is a powerful and versatile tool for a variety of applications. For example, fluorescence imaging agents or fluorophores and their corresponding imaging systems have been used to visualize and/or analyze biological systems with high resolution. Organic dyes or fluorophores are perhaps the most widely used and studied imaging agents, partly because their fluorescence mechanisms are well-understood by researchers. Other fluorescent probes have also been developed, including quantum dots (QD), green fluorescent proteins (GFP), graphene oxides (GO), and carbon dots (CD). However, some major fluorescence imaging agents used for imaging applications such as biomedical imaging applications suffer from one or more disadvantages, including photobleaching, short lifetimes, intrinsic toxicity, lack of biodegradability, and/or instability in vivo. In addition, some existing fluorescence imaging agents also provide relatively weak mechanical strength and/or robustness when incorporated into other material systems. Therefore, there exists a need for improved luminescent species, including for fluorescence imaging and sensing applications.

SUMMARY

In one aspect, methods of sensing an analyte or a plurality of analytes are described herein which, in some embodiments, can provide one or more advantages compared to some other methods. For example, in some embodiments, a method described herein can provide high resolution imaging and quantitative sensing of biological or non-biological chemical environments or compartments without inducing a toxic effect within the environment or compartment. A method described herein, in some cases, utilizes a composition that is biodegradable and that can form a stable dispersion or solution in vivo. Moreover, as described further hereinbelow, time-gated and/or band-shifted imaging using methods described herein, in some embodiments, can be used to improve the signal-to-noise ratio (SNR) of the imaging. In particular, reduction of noise due to autofluorescence of tissue or other background species that may be present.

In some embodiments, for example, a method of sensing comprises disposing a fluorophore in a chemical or biological environment. The fluorophore can comprise a dioxopyridine ring (DPR, also referred to as a citric imide ring (CIR)) or a thiazolopyridine acid (TPA). A method of sensing described herein can further comprise exposing the chemical or biological environment to electromagnetic radiation. The electromagnetic radiation has a wavelength corresponding to an excitation wavelength of the fluorophore. A method of sensing can further comprise detecting light emitted by the fluorophore and correlating the intensity of light emitted by the fluorophore to a presence or absence of an analyte within the biological environment in an amount above a minimum detection threshold.

In some embodiments of methods of sensing described herein, the presence of the analyte modifies an intensity of light emitted by the fluorophore when compared to conditions in which the analyte is absent. For example, in some embodiments, the presence of the analyte reduces or increases the intensity of light emitted by the fluorophore compared to the absence of the analyte. In certain embodiments, the presence of the analyte alters the photoluminescence quantum yield of the fluorophore compared to the absence of the analyte. Further, in some cases, the presence of the analyte alters the fluorescence lifetime of the fluorophore compared to the absence of the analyte. In addition, the presence of the analyte, in some embodiments, shifts the peak emission wavelength and/or the peak excitation wavelength of the fluorophore compared to the absence of the analyte.

In some embodiments, the fluorophore is attached to or immobilized in a polymer or hydrogel. In such embodiments, the environment is or can be a solid state environment, and the method senses the analyte in real time. Further, in some embodiments, the fluorophore is selected from CA-Cys, CA-Cysteamine, CA-Homocysteine, CA-Penicillamine, CA-Ala, CA-Gly, CA-Propylamine, CA-Methyl-Serine, and CA-Ethanolamine. Moreover, in some cases, the fluorophore comprises a biodegradable photoluminescent polymer (BPLP). A biodegradable polymer, in some embodiments, degrades in vivo to non-toxic components which can be cleared from the body by ordinary biological processes. In some embodiments, a biodegradable polymer completely or substantially completely degrades in vivo over the course of about 90 days or less, about 60 days or less, or about 30 days or less, where the extent of degradation is based on percent mass loss of the biodegradable polymer, and wherein complete degradation corresponds to 100% mass loss. Specifically, the mass loss is calculated by comparing the initial weight ($W_0$) of the polymer with the weight measured at a pre-determined time point ($W_t$) (such as 30 days) as shown in the following equation:

$$\text{Mass loss}(\%) = \frac{(W_0 - W_t)}{W_0} \times 100.$$

In certain embodiments, the analyte used in methods of sensing described herein comprises hydrogen ions, halide ions, metal ions, halogens, reactive oxygen species, reactive nitrogen species, and/or an organic solvent. In embodiments in which the analyte comprises hydrogen ions, the method can comprise a method of sensing pH within the chemical or biological environment. In such embodiments, the fluorophore may sense pH within a range of 0 to 11 with an accuracy within ±0.5 pH units. In some embodiments, the fluorophore may exhibit an isosbestic point with respect to pH or an isosbestic region with respect to pH. In such embodiments, the fluorophore can exhibit a decrease in peak emission intensity and/or photoluminescence quantum yield as a function of pH. In certain other embodiments, the analyte comprises hydrogen ions and halide ions. Thus, in some embodiments, the fluorophore can exhibit a first spectroscopic change in response to hydrogen ion concentration and a second spectroscopic change in response to the presence of halide ions.

In another aspect, methods of imaging are described herein. In some embodiments, a method of imaging comprises disposing a fluorophore in a chemical or biological environment. The fluorophore can comprise a dioxo-pyridine ring (DPR) or a thiazolopyridine acid (TPR). A method of imaging described herein further comprises exposing the chemical or biological environment to electromagnetic radiation having a wavelength corresponding to an excitation wavelength of the fluorophore and detecting light emitted by the fluorophore. The light emitted by the fluorophore is detected after a time delay that is longer than the autofluorescence lifetime of a background species present in the chemical or biological environment. In some embodiments of methods of imaging described herein, the background species comprises biological tissue. In such embodiments, the autofluorescence lifetime of the biological tissue can be up to about 4 nanoseconds (ns) or up to about 5 ns. In certain embodiments, the time delay is at least 10 ns.

Further, in some embodiments, a method of imaging described herein comprises disposing a fluorophore comprising a dioxo-pyridine ring (DPR) in a biological environment. In such embodiments, the fluorophore has an excitation wavelength-dependent photoluminescence emission profile comprising at least one short wavelength emission peak and at least one long wavelength emission peak. Methods consistent with such embodiments further comprise exposing the biological environment to electromagnetic radiation having a wavelength corresponding to an excitation wavelength of a long wavelength emission peak of the fluorophore. Such methods further comprise detecting photoluminescence emitted by the fluorophore at the wavelength corresponding to the long wavelength emission peak of the fluorophore. In some such embodiments, the photoluminescence emitted by the fluorophore has a peak wavelength that differs from a peak emission wavelength of a background species present in the biological environment. In certain cases, the peak emission wavelength of the background species comprises a tissue autofluorescence peak emission wavelength.

In a further aspect, luminescent compositions are described herein. In some instances, a luminescent composition described herein comprises a reaction product of (i) a polycarboxylic acid or functional equivalent thereof and (ii) a chemical species comprising a conjugated moiety, a thiol moiety, and/or an amine moiety (such as a primary amine moiety), wherein the thiol moiety and the amine moiety are bonded to vicinal carbons of the conjugated moiety.

In some embodiments of compositions described herein, the sulfur of the thiol moiety and the nitrogen of the amine moiety are directly bonded to the vicinal carbons. Further, in some embodiments, the conjugated moiety is an aromatic moiety. In some cases, the chemical species of a composition described herein comprising a conjugated moiety, a thiol moiety, and an amine moiety is 2-aminothiolphenol. In certain embodiments, the polycarboxylic acid or functional equivalent thereof comprises citric acid, a citrate, or an ester of citric acid. Additionally, in some instances, the polycarboxylic acid or functional equivalent thereof comprises tricarballylic acid, succinic acid, methanetetracarboxylic acid, aconitic acid, citraconic acid, acetodicarboxylic acid, or itaconic acid. Further, in some embodiments, the composition is a reaction product of (i) a polycarboxylic acid or functional equivalent thereof, (ii) a chemical species comprising a conjugated moiety, a thiol moiety, and an amine moiety, and (iii) a polyol. Moreover, in some embodiments, the composition is a reaction product of (i) a polycarboxylic acid or functional equivalent thereof, (ii) a chemical species comprising a conjugated moiety, a thiol moiety, and an amine moiety, (iii) a polyol, and (iv) an additional amine, an amide, or an isocynate. In some cases, the reaction product is a polymer or oligomer.

These and other embodiments are described in more detail in the detailed description which follows.

DETAILED DESCRIPTION OF THE INVENTION

Figure 1A:
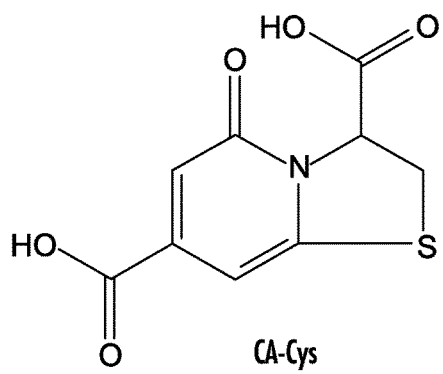
FIGS. 1A and 1B illustrate chemical structures of representative citric acid derived dyes usable in methods and compositions described herein.
Figure 1A:
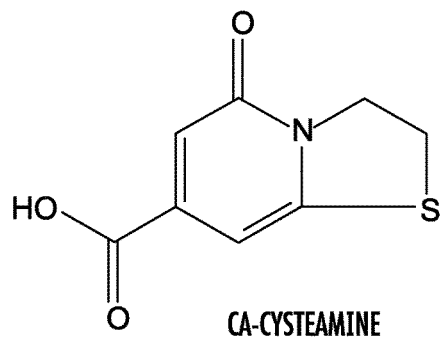
Figure 1A:
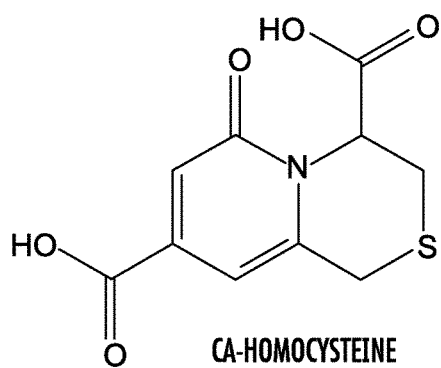
Figure 1A:
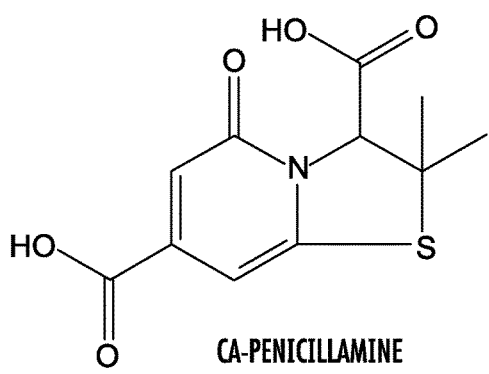

Embodiments described herein can be understood more readily by reference to the following detailed description, examples, and figures. Elements, apparatus, and methods described herein, however, are not limited to the specific embodiments presented in the detailed description, examples, and figures. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "from 5 to 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The present disclosure describes the development of novel citric acid-based fluorescent dyes (CFDs) via a simple method and their applications in optical imaging, biological applications, biomedical applications, and other areas. Such fluorescent dyes can be synthesized via a simple one-pot reaction from citric acid (or similar acids) and a primary amine. Further, such citric acid-based fluorescent dyes can comprise fluorophores that can be divided into two major categories or genera: fluorophores containing a dioxo-pyridine ring (DPR), and fluorophores containing a thiazolo-pyridine acid (TPA). The structures of DPR and TPA are described further hereinbelow. In general, DPR-containing CFDs are organic dyes with strong and tunable fluorescence (wherein the emission wavelength shifts with different excitation wavelengths, up to near-infrared). By comparison, TPA-containing CFDs are dyes with much higher quantum yield and an emission peak that is substantially fixed with various excitation wavelengths. Both DPR and TPA exhibit exceptionally good photostability. In addition, CFDs offer unique water-solubility and cytocompatibility at high dosage, which are much better than traditional organic dyes and inorganic fluorescent materials like quantum dots. Thus, CFDs can be particularly suitable for biological imaging. Specifically, CFDs described herein can be used for cell labeling, cell tracking, fluorescence staining, immunofluorescence staining, diagnostics for cancer and other diseases, theranostic drug delivery, and so on. CFDs can also be conjugated or incorporated into other materials, such as polymers, thus making a new family of fluorescent materials.

In some embodiments, CFDs can be utilized in sensing applications for detection, diagnosing, and/or monitoring analyte levels associated with one or more illnesses, disorders, or diseases within a patient. For example, in some embodiments, CFDs described herein can be used to sense chloride levels present in one or more bodily fluids. In some cases, such sensing can be used as a means for detecting or monitoring conditions such as cystic fibrosis in a patient.

The present disclosure provides citric acid-based fluorescent dyes (CFDs) that can be used as fluorophores for many biomedical and non-biological applications. The CFDs of the present disclosure can be synthesized from organic acids such as citric acid or tricarballylic acid, and a primary amine including one of natural and synthetic amino acids, amino thiols, monoamines, diamines, triamines, etc. The synthetic method is simple, efficient, and cost-effective, with only one step from (commercially available) starting materials under mild conditions. The synthesis procedures can also be carried out in a "one-pot" manner. In the following detailed description, it is to be understood that theoretical statements and conclusions are not intended to limit the scope of the present invention.

Selected aspects of the present invention will now be discussed in further detail.

I. Methods of Sensing

In one aspect, methods of sensing an analyte or a plurality of analytes in a biological or non-biological environment are described herein. In some embodiments, for example, a method of sensing comprises disposing a fluorophore described herein, such as a fluorophore comprising a DPR or TPA, in a biological, non-biological, or chemical environment. Any fluorophore described herein may be used in a method of sensing described herein. Moreover, different fluorophores described herein can show varying sensitivities to different analytes. In addition, a method of sensing described herein can further comprise exposing the biological, non-biological, or chemical environment to electromagnetic radiation having a wavelength corresponding to an excitation wavelength of the fluorophore; detecting light emitted by the fluorophore; and correlating the light emitted by the fluorophore to the presence or absence of one or more analytes within the environment, including in an amount above a minimum detection threshold. Moreover, in some embodiments, the light emitted by the fluorophore is correlated to a concentration of one or more analytes within the environment. "Correlating," as used herein, does not necessarily refer to mathematical correlation, such as mathematical correlation of variables. Instead, "correlating" refers to using one or more properties or characteristics of the light emitted by the fluorophore to identify whether one or more analytes is present or absent within the environment, or to identify a concentration of one or more analytes within the environment. Specific examples and/or embodiments demonstrating a correlating step are described further herein below. However, it is generally to be understood that a correlating step can include, without limitation, using a measured amount of light emitted by the fluorophore, using a measured photoluminescence quantum yield of the fluorophore, and/or using a measured fluorescence lifetime of a fluorophore (e.g., as compared against a baseline or "control" level) to determine whether an analyte is present or absent within an environment, or to determine the concentration of an analyte within an environment described herein.

The steps of a method described herein can be carried out in any manner not inconsistent with the objectives of the present disclosure. For example, a fluorophore described herein can be disposed in any desired biological or non-biological or chemical environment. For instance, a biological environment may include an in vivo environment or an in vitro environment. In some cases, the biological environment comprises a healthy organ or healthy tissue. In other instances, the biological environment comprises a diseased organ or diseased tissue. The biological environment may also comprise a healthy or diseased cell or population of cells. In some embodiments, the biological environment comprises a blood vessel or the blood stream of a patient. The biological environment may also comprise a bodily fluid, bodily fluid stream, or bodily fluid vessel other than blood, a blood stream, or a blood vessel. For example, in some instances, the biological environment comprises sweat or urine, or a vessel or stream of sweat or urine. A chemical environment, in some cases, comprises or defines a non-biological aqueous environment. A chemical environment can also comprise or define an organic solution, colloid, or mixture, or a solid state environment. For example, in some instances, an environment is a solid state environment comprising or defined by a polymer or hydrogel. In some such embodiments, a fluorophore described herein is attached or conjugated to and/or immobilized in a polymer or oligomer backbone or hydrogel of the environment. As described further herein below, solid state, real-time analyte detection or monitoring can thus be provided by a method described herein. "Real-time," for reference purposes herein, indicates that detection may be performed at the same rate or at substantially the same rate as fluorescence data is provided by the method, or, alternatively, that detection may be performed at the same time, or at substantially the same time, as fluorescence occurs in an environment. For example, in some cases, real-time detection or monitoring occurs within 1 second, within 1 millisecond (ms), within 100 microseconds (µs), or within 10 µs of a corresponding occurrence of fluorescence. In some instances, real-time detection or monitoring occurs at a rate that is within 1%, within 0.5%, or within 0.1% of a corresponding rate of provision of fluorescence data, where the percentage is based on the larger rate.

Similarly, a fluorophore disposed in an environment described herein can be exposed to electromagnetic radiation in any manner not inconsistent with the objectives of the present disclosure. In some cases, for instance, a laser excitation source is used. In other embodiments, a non-laser light emitting diode excitation source is used. Further, the excitation wavelength can be in any region of the electromagnetic spectrum suitable to excite a chosen fluorophore. In some embodiments, the excitation wavelength is the ultraviolet (UV) (e.g., between 100 nm and 350 nm) or visible region (e.g., between 350 nm (or 351 nm) and 800 nm) of the electromagnetic spectrum. Likewise, any suitable detector may be used to detect light emitted by a fluorophore in a manner described herein. In some embodiments, for example, a two-dimensional detector such as a charge-coupled device (CCD) image sensor or camera is used. In other instances, a photomultiplier tube is used.

In addition, the correlating step of a method of sensing described herein can be based on any metric, spectroscopic property, or other feature of the fluorophore and/or analyte not inconsistent with the objectives of the present disclosure. For example, in some instances, the presence of an analyte alters the amount of light emitted by the fluorophore, compared to the amount of light emitted by the fluorophore in the absence of the analyte. In some cases, the presence of the analyte alters the photoluminescence quantum yield of the fluorophore. In some instances, the presence of an analyte reduces the quantum yield or amount of light emitted by the fluorophore, compared to when there is no analyte. Alternatively, in other embodiments, the presence of an analyte increases an amount of light emitted by the fluorophore and/or increases the quantum yield of the fluorophore, compared to when there is an absence of the analyte. Additionally, in some cases, the presence of an analyte shifts the peak emission wavelength and/or the peak excitation or absorption wavelength of the fluorophore. Further, in some instances, the presence of an analyte alters the fluorescence lifetime of the fluorophore, compared to the absence of the analyte.

Moreover, a method of sensing described herein can be used to detect the presence or absence of a variety of possible analytes. For example, in some instances, the analyte comprises hydrogen ions, halide ions (such as chloride ions, bromide ions, and/or iodide ions), halogens such as chlorine, metal ions such as iron cations, reactive oxygen species such as hydrogen peroxide, and/or reactive nitrogen species such as nitric oxide. The analyte may also be an organic solvent, such as acetone, dioxane, and/or dichloromethane. A method described herein may also be used to detect more than one of the foregoing analytes, either simultaneously or sequentially.

In some cases, the analyte comprises hydrogen ions, such that the method of sensing is a method of sensing pH within an environment, such as a biological environment. In some such embodiments, a method described herein senses pH within a broad pH range at a high accuracy. For instance, in some cases, a method described herein senses pH within a range of 0 to 11, 0 to 3, or 4 to 10 with an accuracy within ±1 or ±0.5 pH units. Further, such accuracy can be achieved in a variety of ways by a method described herein. For example, in some embodiments, pH (or the presence of another analyte) is sensed based on a change in one or more of the excitation maximum, peak emission wavelength, photoluminescence quantum yield, and fluorescence lifetime of the fluorophore. Moreover, in some instances, the metric used to detect pH can vary based on a desired range of pH values to be detected. For example, in some cases, the fluorophore has a first excitation maximum wavelength at a first pH within the biological (or non-biological) environment and a second excitation maximum wavelength at a second pH within the biological (or non-biological) environment, wherein the first pH and the second pH differ by 1 or less, and wherein the first excitation maximum wavelength and the second excitation maximum wavelength differ by at least 5 nm. In other instances, the first pH and the second pH differ by 2 or less or 3 or less. In still other embodiments, the first pH and the second pH differ by 2 or less or 3 or less. In still other embodiments, the first pH and the second pH differ by 1.5 or more, 2 or more, or 3 or more. The difference in pH may also be 0.5-10, 0.5-9, 1-10, 1-9, 1-8, 1-5, -13, or 2-8. In addition, in some cases, the first pH is 0-2.5 and the second pH is 3-11. In other instances, the first pH is 2-3.5 and the second pH is 6-11. Similarly, the difference between the first and second excitation maxima in such a method can be at least 10 nm or at least 15 nm. In some instances, the difference between the first and second excitation maxima is 5-15 nm, 5-10 nm, or 10-15 nm. Thus, a method of sensing described herein, in some cases, can provide high sensitivity and/or a large response to a relatively small change in analyte concentration.

Similarly, in yet another exemplary embodiment, the peak emission wavelength of the fluorophore is used to detect an analyte such as hydrogen ions. Thus, in some cases, the fluorophore has a first peak emission wavelength at a first pH within the biological environment and a second peak emission wavelength at a second pH within the biological environment, wherein the first pH and the second pH differ by 1 or less, and wherein the first peak emission wavelength and the second peak emission wavelength differ by at least 5 nm. In some embodiments, the first pH and the second pH differ by 2 or less or 3 or less. In still other instances, the first pH and the second pH differ by 1.5 or more, 2 or more, or 3 or more. The differences in pH may also be 0.5-10, 0.5-9, 1-10, 1-9, 1-8, 1-5, 1-3, or 2-8. Further, in some instances, the first pH is 0-2.5 and the second pH is 3-11. In some cases, the first pH is 0-3.5 and the second pH is 4.5-11. Moreover, in some embodiments, the difference between the first and second emission peaks is at least 10 nm, at least 15 nm, at least 20 nm, or at least 25 nm. In still other instances, the difference is 5-25 nm, 5-20 nm, 5-15 nm, 10-25 nm, 10-20 nm, or 15-25 nm.

In another embodiment, the peak emission intensity of the fluorophore is used to detect an analyte. For example, in some cases, the fluorophore has a first peak emission intensity at a first pH within the environment and a second peak emission intensity at a second pH within the environment, wherein the first pH and the second pH differ by 0.5 or less, and wherein the first peak emission intensity and the second peak emission intensity differ by at least 15%, based on the larger intensity value. In other instances, the difference in the first pH and the second pH is 1 or less, 2 or less, or 3 or less. The pH difference may also be 0.5 or more, 1.5 or more, 2 or more, or 3 or more. Additionally, in some embodiments, the difference between the first pH and the second pH is 0.5-10, 0.5-9, 1-10, 1-9, 1-8, 1-5, 1-3, 3-11, 3-10, 3-8, or 3-5. For instance, in some specific embodiments, the first pH is 0-1, 0-2, or 0-3, and the second pH is 3-11 or 4-11. In still other cases, the first pH is 0-3.5 and the second pH is 4.5-11. Further, in some instances, the difference between the first peak emission intensity and the second peak emission intensity is at least 20%, at least 30%, or at least 50%, where the percentage is based on the larger intensity value as the denominator. In some cases, the difference between the first and second peak emission intensities is 10-50%, 10-40%, 10-30%, 15-50%, 15-30%, 20-50%, or 20-40%.

In still another exemplary embodiment of a method of sensing described herein, the photoluminescence quantum yield of a fluorophore is used to detect the presence or absence of an analyte. In some such cases, for instance, the fluorophore has a first photoluminescence quantum yield at a first pH within the environment and a second photoluminescence quantum yield at a second pH within the environment, wherein the first pH and the second pH differ by 0.5 or less, and wherein the first photoluminescence quantum yield and the second photoluminescence quantum yield differ by at least 5%. In other embodiments, the difference between the first pH and the second pH is 1 or less, 2 or less, or 3 or less. The pH difference may also be 0.5 or more, 1.5 or more, 2 or more, or 3 or more. In some cases, the first pH and the second pH differ by 0.3-2, 0.5-1.5, 0.5-1, 1-10, 1-8, 1-5, 1-3, 3-11, 3-10, 3-8, or 3-5 pH units. For example, in some specific cases, the first pH is 0-1 and the second pH is 1.5-2.5. In other instances, the first pH is 0-1 and the second pH is 3.5 or greater, or the first pH is 1.5-3 and the second pH is 4.5 or greater, or the first pH is 3.5 or less and the second pH is 5 or greater. Additionally, in some embodiments wherein quantum yield is used as a metric for detecting an analyte, the difference between the first and second quantum yield values is at least 10%, at least 15%, at least 20%, at least 30%, at least 40%, or at least 50%, where the percentage is obtained by subtracting the lower quantum yield value from the higher quantum yield value. In some cases, the difference between the first and second quantum yields is 5-50%, 5-40%, 5-30%, 5-20%, 10-50%, 10-40%, 10-30%, 15-50%, 15-40%, 15-30%, 20-50%, 20-40%, or 30-50%. Thus, once again, it is to be understood that a method of sensing described herein, in some cases, can provide high sensitivity and/or a large response to a relatively small change in analyte concentration.

As described above, it is also possible for the fluorescence lifetime of a fluorophore to be used to detect the presence or absence of an analyte according to a method of sensing described herein. For instance, in some cases, the fluorophore has a first fluorescence lifetime at a first pH within an environment and a second fluorescence lifetime at a second pH within the environment, wherein the first pH and the second pH differ by 2 or less, and wherein the first fluorescence lifetime and the second fluorescence lifetime differ by at least 1 ns. In some instances, the first pH and the second pH differ by 2 or less, or 3 or less. The first and second pH may also differ by 0.5 or more, 1 or more, 1.5 or more, 2 or more, or 3 or more. Additionally, in some cases, the first pH and the second pH differ by 0.5-10, 0.5-3, 1-10, 1-5, 1-3, 2-10, or 2-5 pH units. For example, in some embodiments, the first pH is 0-3 and the second pH is 4.5-10.5. Further, in some instances, the first fluorescence lifetime and the second fluorescence lifetime differ by 1-3 ns, 1-2 ns, or 2-3 ns.

Moreover, in some cases, more than one of the foregoing metrics or properties of a fluorophore is used to detect the presence or absence of an analyte in a biological environment or other environment. For example, in some embodiments, the fluorophore exhibits a bathochromic shift in peak emission wavelength and also a reduced emission intensity at a pH of 3 or less, compared to at a pH of 7 or higher, as described further hereinbelow. Similarly, in some cases, the fluorophore exhibits a hypsochromic shift in peak emission wavelength and also an increased emission intensity at a pH below a pKa of the fluorophore, compared to at a pH above the pKa of the fluorophore.

Additionally, in some instances, a fluorophore used in a method described herein exhibits an isosbestic point or isosbestic region as a function of pH. Moreover, in some such cases, the fluorophore further exhibits a decrease in peak emission intensity and/or photoluminescence quantum yield as a function of pH. Thus, as described further hereinbelow, such a fluorophore can be used as a ratiometric pH sensor. Ratiometric sensors for pH (or for another analyte described herein) can permit highly accurate pH (or other analyte) detection over a variety of ranges of pH values (or other analyte concentration values). For example, in some instances, a fluorophore described herein is a ratiometric pH sensor from pH 3 to pH 4.5 with an accuracy of ±0.1 pH units. Other pH ranges are also possible.

Moreover, in some methods of sensing described herein, a fluorophore or combination of fluorophores can be used to detect the presence or absence of more than one analyte. For example, in some cases, the analyte of a method described herein comprises hydrogen ions and halide ions. In some such instances, the fluorophore exhibits a first spectroscopic change (such as a change described hereinabove) in response to a first analyte concentration (such as hydrogen ion concentration) and a second spectroscopic change in response to the presence of a second analyte (such as halide ions). Additionally, in some embodiments, the fluorophore is sensitive to a second analyte only if a first analyte is also present. Thus, in some instances, a method of sensing described herein can provide facile, efficient, highly sensitive, and/or quantitative detection of complex mixtures of analytes, as described further below.

Further, the minimum detection threshold of a method of sensing described herein can be low. For example, in some cases, the minimum detection threshold for an analyte (such as halide ions) is less than 10 mM, less than 5 mM, less than 1 mM, less than 100 µM, or less than 20 µM. In some instances, the minimum detection threshold for an analyte is 0.001 mM to 0.01 mM, 0.01 mM to 10 mM, 0.01 mM to 5 mM, or 0.01 to 1 mM. Other minimum detection thresholds are also possible.

II. Methods of Imaging

In another aspect, methods of imaging are described herein. In some cases, a method of imaging described herein is carried out using a luminescent composition described herein, including a luminescent composition described hereinbelow. Such a luminescent composition can be disposed in a biological or non-biological environment and subsequently used to image the environment by detecting light emitted by the luminescent composition. In some embodiments, for example, a method of imaging comprises disposing a fluorophore in a biological environment, the fluorophore comprising a dioxo-pyridine ring (DPR) or a thiazolopyridine acid (TPA). Any chemical or biological environment can be used consistent with the description of such environments provided herein above, such as in Section I of the present disclosure. Such a method can further comprise exposing the biological environment to electromagnetic radiation having a wavelength corresponding to an excitation wavelength of the fluorophore; and detecting light emitted by the fluorophore. Further, in some cases, the light emitted by the fluorophore is detected after a time delay that is longer than the autofluorescence lifetime of a background species present in the environment. Detection of the light emitted by the fluorophore can be performed in any manner not inconsistent with the present invention. For example, detection consistent with the above description in Section I or the following examples may be used. In some embodiments, for example, the background species comprises biological tissue and the autofluorescence lifetime of the biological tissue is up to about 4 ns or up to about 5 ns. Additional, non-limiting examples of background species are provided in the specific examples herein below. Thus, in some cases, the time delay of a method of imaging described herein is at least about 5 ns, at least about 6 ns, at least about 8 ns, or at least about 10 ns. In some instances, the time delay is about 8-15 ns, about 8-12 ns, or about 10-15 ns.

Additionally, in some cases, a method of imaging described herein comprises disposing a fluorophore described herein (such as a fluorophore comprising a DPR) in a biological environment, wherein the fluorophore has an excitation wavelength-dependent photoluminescence emission profile. Such an emission profile, in some cases, comprises at least one short wavelength emission peak and at least one long wavelength emission peak. Thus, in some instances, a method described herein can further comprise exposing the biological environment to electromagnetic radiation having a wavelength corresponding to an excitation wavelength of a long wavelength emission peak of the fluorophore; and detecting photoluminescence emitted by the fluorophore at the wavelength corresponding to the long wavelength emission peak of the fluorophore. It is to be understood that "short" and "long" wavelengths are "short" and "long" relative to one another, such that a "short" wavelength emission peak for a given fluorophore (such as a DPR-containing fluorophore) is a peak emission wavelength that is shorter than (or "to the blue" of) a "long" wavelength emission peak. Similarly, the "long" wavelength emission peak is longer than (or "to the red" of) the short wavelength emission peak. Moreover, in some such methods of imaging described herein, the photoluminescence emitted by the fluorophore has a peak wavelength that differs from a peak emission wavelength of a background species present in the environment. For example, in some such instances, the peak emission wavelength of the background species comprises a tissue autofluorescence peak emission wavelength. Further, in some cases, the photoluminescence emitted by the fluorophore is detected after a time delay that is longer than the autofluorescence lifetime of a background species, as described hereinabove.

III. Luminescent Compositions

In a further aspect, luminescent compositions are described herein. In some instances, a luminescent composition described herein comprises, consists, or consists essentially of a molecular fluorophore or dye described herein, such as a "citric acid-based fluorescent dye" or "CFD" described herein. In other cases, as described further hereinbelow, a luminescent composition comprises, consists, or consists essentially of a polymer or oligomer comprising a luminescent moiety formed or derived from a fluorophore or dye described herein. For example, in some cases, a luminescent composition comprises a "biodegradable photoluminescent polymer" or "BPLP." It is to be understood that a luminescent "fluorophore" or "dye" described herein can be "photoluminescent" in general or "fluorescent" or "phosphorescent" more specifically. Moreover, it is to be understood that luminescent compositions described herein are not intended to be limited by the nature, characterization, or nomenclature of the light emission process of the luminescent compositions.

In some embodiments, a luminescent composition described herein comprises a reaction product of (i) a polycarboxylic acid or functional equivalent thereof and (ii) a chemical species comprising a conjugated moiety, a thiol moiety, and/or an amine moiety such as a primary amine moiety, wherein the thiol moiety and the amine moiety can be bonded to vicinal carbons of the conjugated moiety. In particular, in some cases, the sulfur of the thiol moiety and the nitrogen of the amine moiety can be directly bonded to the vicinal carbons, such that the sulfur and the nitrogen have a 1,4 or $\alpha,\delta$ relationship. Moreover, in some instances, the sulfur of the thiol moiety and the nitrogen of the amine moiety are directly bonded to the vicinal carbons. In addition, in some embodiments, the conjugated moiety of a reaction product described herein is an aromatic moiety, such as a cyclic aromatic moiety such as a phenyl moiety. For example, in some instances, the chemical species comprising a conjugated moiety, a thiol moiety, and an amine moiety is 2-aminothiolphenol. Other conjugated chemical species may also be used. For example, 4-aminothiolphenol may be used in certain embodiments.

Further, any polycarboxylic acid or functional equivalent thereof not inconsistent with the objectives of the present disclosure may be used to form a reaction product of a luminescent composition described herein. Moreover, a "functional equivalent" of a polycarboxylic acid, in some cases, can be an ester (such as a methyl or ethyl ester) of a polycarboxylic acid, an acid chloride of a polycarboxylic acid, or a cyclic anhydride. As understood by one of ordinary skill in the art, such "functional equivalents" of a polycarboxylic acid can form the same reaction product as a polycarboxylic acid when used in a synthetic protocol described herein, such as a synthetic protocol including one or more condensation reactions. However, it is to be understood that one or more co-products of such a reaction may differ if a functional equivalent of a polycarboxylic acid is used. For example, in some instances, a co-product can include HCl or MeOH rather than $H_2O$. In addition, a polycarboxylic acid or functional equivalent thereof of a composition described herein can be saturated or unsaturated. For example, in some instances, a polycarboxylic acid or functional equivalent thereof comprises maleic acid, maleic anhydride, fumaric acid, or fumaryl chloride. In addition, in some cases, the polycarboxylic acid is a di-carboxylic acid. Tri-carboxylic acids and tetra-carboxylic acids may also be used. More specifically, in some embodiments, the polycarboxylic acid or functional equivalent thereof of a reaction product described herein comprises citric acid, a citrate, or an ester of citric acid such as triethyl citrate. In other cases, the polycarboxylic acid or functional equivalent thereof comprises tricarballylic acid, succinic acid, methanetetracarboxylic acid, aconitic acid, citraconic acid, acetodicarboxylic acid, or itaconic acid. Other species may also be used.

Further, in some embodiments, a luminescent composition described herein comprises a reaction product of (i) a polycarboxylic acid or functional equivalent thereof described herein, (ii) a conjugated chemical species described herein, and (iii) one or more additional reactants. For instance, in some cases, a composition comprises a reaction product of the foregoing reactants (i) and (ii) with (iii) a polyol. Non-limiting examples of polyols/polyamines suitable for use in some embodiments described herein include C2-C20, C2-C12, or C2-C6 aliphatic alkane diols, including α,ω-n-alkane diols, or α,ω-alkene diols. For instance, in some cases, a polyol comprises 1,4-butanediol, 1,6-hexanediol, 1,8-octanediol, 1,10-decanediol, 1,12-dodecanediol, 1,16-hexadecanediol, or 1,20-icosanediol. Branched α,ω-alkane diols or α,ω-alkene diols can also be used. Additionally, a polyol can also be an aromatic diol. Further, in some embodiments, a polyol comprises a poly (ethylene glycol) (PEG) or poly(propylene glycol) (PPG) having terminal hydroxyl groups. Any such PEG or PPG not inconsistent with the objectives of the present disclosure may be used. In some embodiments, for instance, a PEG or PPG has a weight average molecular weight between about 100 and about 5000 or between about 200 and about 1000. Triols may also be used in some cases. In addition, in some instances, a composition described herein comprises a reaction product of (i) a polycarboxylic acid or functional equivalent thereof described herein, (ii) a conjugated chemical species described herein, (iii) a polyol, and (iv) an additional amine, an amide, or an isocyanate. The additional amine, in some cases, comprises one or more primary amines having two to ten carbon atoms. In other cases, the additional amine comprises one or more secondary or tertiary amines having two to fifteen carbon atoms. The isocyanate, in some embodiments, comprises a monoisocyanate. In other instances, the isocyanate comprises a diisocyanate such as an alkane diisocyanate having four to twenty carbon atoms.

Moreover, a reaction product of a plurality of chemical species described herein, in some cases, is a condensation reaction product of the chemical species. Further, in some embodiments, the reaction product is a polymer or oligomer formed from the recited chemical species.

Thus, as described herein, CFDs can be used as pH sensors in the acidic range, such as in gastric juice and acidic intracellular compartments. CFDs can also be used as halide sensors for environmental, laboratory, and biomedical applications. CFD fluorescence-based measurements may allow halide detection in nanoliter volumes, and pH-dependence of halide quenching may allow switchable detection for real-time sensing. Moreover, as described further hereinbelow, CFDs can be used as pH sensors and/or halide sensors based on intensity and/or fluorescence lifetime. Further, CFDs can be used as solvent polarity sensors base on band shifting. Moreover, CFDs can be used as solvent polarity sensors by both wavelength shifting and fluorescence lifetime. CFDs can also be used for fluorescence lifetime imaging (FLIM), "FLIM," as referenced herein, indicates an imaging technique for producing an image based on the differences in the exponential decay rate of the fluorescence of a sample or dye.

Example 1

Overview of Synthesis and Characterization of Luminescent Compositions

A. Synthesis of CFDs

Citric acid (or another polycarboxylic acid or functional equivalent thereof, such as tricarballylic acid) and a primary amine compound were added into a flask at a molar ratio of about 1:1. 10 mL DI water was added into the flask to dissolve both compounds completely. The reaction was then conducted at 100-140° C. under vacuum for 2 to 4 hours. The reaction was terminated by adding 15 mL cold DI water to dissolve the products. Amino thiols were used to synthesize TPAs and other primary amines were used to produce DPRs (primary amines included amino acids (except thiol containing amino acids), monoamines, and diamines). Purification of CFDs was performed by recrystallization twice in DI water or by a Shimadzu HPLC with a C18 column and a fraction collector. Not intending to be bound by theory, synthesis routes of DPR and TPA are shown in FIGS. 2A, 2B, 3A, and 3B. Table I provides structures of representative BPLPs having DPR or TPA structures. Table II provides additional DPR and TPA structures.

TABLE I

Summary of representative CFDs with DPR and TPA structures and their fluorescent properties.

| Dye | Structure | Max. Ex. Wavelength (nm) | Max. Em. Wavelength (nm) | Quantum Yield (%) | Shifting |
|---|---|---|---|---|---|
| CA-Cys | | 364 | 445 | 81.4 | No |
| CA-Cysteamine | | 365 | 445 | 79.3 | No |
| CA-Ala | | 361 | 430 | 21.2 | Yes |
| CA-Gly | | 357 | 434 | 39.0 | Yes |
| CA-Propylamine | | 359 | 422 | 22.1 | Yes |
| CA-EDA | | 377 | 440 | 9.2 | Yes |

TABLE II

BPLPs having DPR or TPA structures.

| BPLP | Structure |
|---|---|
| BPLP-Cysteamine | |
| BPLP-Homocysteine | |

TABLE II-continued

BPLPs having DPR or TPA structures.

| BPLP | Structure |
|---|---|
| BPLP-Propylamine | |
| BPLP-Gly | |

B. Synthesis of Polymers and Dyes

All chemicals and reagents were purchased from Sigma-Aldrich or Alfa Aesar, and used without further purification. Briefly, citric acid (or tricarballylic acid, succinic acid), 1,8-octanediol, and one of amino acids or amines (molar ratio 1:1:0.2) were reacted in a flask at 140° C. under nitrogen for 2 hours. Upon the end, 1,4-dioxane was added to terminate the reaction and dissolve the resulting polymer, followed by precipitation in DI water and lyophilization. Small molecular fluorophores were synthesized by adding citric acid (or tricarballylic acid, succinic acid) and one of amino acids or primary amines at 1:1 molar ratio into 10 mL DI water. The reaction was conducted at 140° C. under vacuum for 4 hours and terminated by adding cold DI water. The product was purified by recrystallization in DI water three times or a preparative HPLC with a Shimadzu HPLC system equipped with a C18 column and a fraction collector.

In addition to the materials described herein, 6-membered ring structures consistent with the disclosure contained in U.S. Pat. No. 9,145,467 were also produced by the above synthetic protocol. The entirety of U.S. Pat. No. 9,145,467 is hereby incorporated by reference.

C. Characterization of Polymers and Dyes

Fluorescence spectra were recorded by a Horiba Fluoro-Max-4 spectrofluorometer. All polymer and small molecule samples were measured at a concentration of 2% w/w in 1,4-dioxane or DI water and a slit size of 1 nm by 1 nm unless otherwise specified. Quantum yields were also determined on the same spectrofluorometer by using a Quantum-φ integration sphere at the same concentration and slit size with the blank solvent as the reference. $^1$H-NMR, $^{13}$C-NMR were performed on a JNM ECS 300 spectrometer using DMSO-$d_6$ or $D_2O$ as solvents. Attenuated total reflection Fourier transform infrared (ATR-FTIR) spectra were collected with a Bruker V70 spectrometer using BPLP films. A Shimadzu HPLC-MS system with a Phenomenex Kinetex 2.6u XB-C18 100 mm×2.9 mm column, a SPD M20A PDA detector and a RF-20AXS fluorescence detector (Ex. 360 nm and Em. 430 nm) was used to characterize the structures of fluorophores as well. The mobile phase was a gradient of DI water and acetonitrile with 0-6 min 2% acetonitrile, 6-12 min 2%-30% acetonitrile, and 12-15 min 2% acetonitrile. The flow rate was 0.15 ml/min. Electrospray ionization mass spectroscopy (ESI-MS) was performed with a positive voltage of 4.5 kV and negative mode voltage −4.0 kV and a CDL temperature of 200° C. The analysis of the degradation products of BPLPs were conducted by immersing BPLPs in 1M $K_2CO_3$ solution at 37° C. for 24 hours. After degradation, the solutions were neutralized by 1N HCl solution to pH 7 and characterized by HPLC-MS as described above.

D. Time-Resolved Fluorescence Spectroscopy

Fluorescence lifetimes were determined by using the Time-Correlation Single Photon Counting (TCSPC) accessory to the FluroMax-4 (Horiba, NJ). NanoLED pulse light sources at wavelengths of 352 nm and 390 nm were used for excitation. For each decay curve, 10,000 photons were collected. Fluorescence lifetime decays were fitted with an exponential series according to equation 1 below:

$$F(t) = A + B_1 \exp\left(\frac{t}{\tau_1}\right) + B_2 \exp\left(\frac{t}{\tau_2}\right) + B_3 \exp\left(\frac{t}{\tau_3}\right) + \ldots \quad (1)$$

where F(t) is the lifetime decay function with respect to time t, $T_i$ is the lifetime value of the emitting species, A is the background offset, and $B_i$ is the pre-exponential function of the emitting species. The method of least squares was used to quantify $\chi^2$ based on the decay data and the fitting function, where $\chi^2$ values smaller than 1.2 indicates a good fit; and values above 1.2 indicate need for multiple exponential fitting in equation 1. If the lifetime decay is dominated by one emitting species, the equation can be simplified to include only the first two terms. One exponential fitting is good for TPA based fluorophores. However, for DPR based fluorophores, only three exponential fitting gives a $\chi^2$ smaller than 1.2.

E. Computational Modeling

Calculations were performed by means of the Gaussian 09 program package. Geometries of all compounds were allowed to fully relax during the B3LYP/6-311++G optimization process. NICS values were also computed with the B3LYP/6-311++G method through the gauge-including atomic orbital method (GIAO) implemented in Gaussian 09. NICS values at the geometrical center of the perpendicular plane of the ring were calculated. HOMED values were calculated according to Equation 2 using Gaussian with density functional theory B3LYP/6-31G(d).

$$HOMED = 1 - \frac{\alpha}{n} \sum_i^n (R_o - R_i)^2 \quad (2)$$

where α is a normalization constant unique to each bond type and weighted based on the number of double and single bonds in the delocalized system, $R_o$ include the C—C, C—N, and C—O bond lengths at the optimized geometry, n is the number of bonds taken into summation, and $R_i$ are the experimental or computed bond lengths[6]. To calculate the theoretical absorbance wavelengths, ground state geometry optimized with density functional theory B3LYP, at the 6-311G+(d,p) level of theory with a IEFPCM water solvent model. Theoretical absorption spectra was calculated with ZINDO energy calculations by using Gaussian 09[2].

F. Chemical Structure Characterization

Molecular structures of different CFDs were analyzed by $^1$H-NMR, $^{13}$C-NMR, FTIR, and HPLC-MS. For NMR, CFD samples were dissolved in dimethyl sulfoxide-d6 (DMSO-d$_6$) or D$_2$O. $^1$H-NMR, $^{13}$C-NMR was conducted on a 300 MHz JNMECS 300 (JEOL, Tokyo, Japan) NMR. The chemical shifts for the spectra were recorded in parts per million (ppm), and were referenced relative to tetramethylsilane (TMS, 0.00 ppm) as the internal reference. Fourier Transform Infra-Red (FTIR) spectroscopy measurements were recorded at room temperature using a Bruker Vertex 70 spectrometer equipped with ATR unit using 100 scans across the wave numbers 4000-400 cm[1] at a resolution of 2 cm. A Shimadzu HPLC-ESI-MS system was used to characterize the structures and molecular weights of fluorophores as well. The mobile phase for HPLC was a mix of HPLC-grade water and acetonitrile with 0-6 min 2% acetonitrile, 6-8 min 2%-30% gradual increment of acetonitrile, and 8-11 min 2% acetonitrile. The flow rate was 0.15 ml/min with a Phenomenex Kinetex C18 column. Both UV-vis and fluorescence detectors were used, as absorbance at 360 nm and excitation/emission wavelengths of 365 nm/440 nm was set to determine CFDs. Following ESI-MS was performed at 4.5 kV in both positive and negative modes at the dominant HPLC fluorescent peak.

Fluorescence spectra were recorded by a Horiba FluroMax-4 spectrofluorometer. All samples were measured at a concentration corresponding to an optical density of 0.1 in water and a slit size of 1 nm by 1 nm unless specified. Quantum yields were also determined on same spectrofluorometer by using a Quantum-φ integration sphere at samples' maximum excitation wavelength and at an increment of 0.3 nm. Photostability studies were done by continuously exciting samples at their maximum excitation wavelength and monitoring at the maximum emission wavelength.

NIH 3T3 mouse fibroblasts (ATCC) were used as model cells for in vitro cytotoxicity evaluations. The cells were cultured in Dulbecco's modified eagle's medium (DMEM), which had been supplemented with 10% fetal bovine serum (FBS) and 1% penicillin streptomycin. The culture flasks were kept in an incubator maintained at 37° C., 5% $CO_2$, and 95% relative humidity. For a typical cytotoxicity study, 3T3 cells were seeded with a density of 5×10$^4$ cells/ml. 200 mL of cell suspension in DMEM was added to each well in a 96-well plate and then incubated for 24 h. The culture medium was changed to 100 μL of DMEM containing the CFDs with various concentrations and followed by another 24 h incubator. A CCK-8 cell viability assay was used for a quantitative assessment of the viable cells according to the manufacturer's protocol. Viability of cells was normalized to the control of tissue culture plates (n=5).

Example 2

Properties of Luminescent Compositions

A. Synthesis of CFDs for Fluorescence Characterization

Two families of citric acid based fluorescent dyes (CFDs) were developed, including CFDs with a dioxo-pyridine ring (DPR) and thiazolopyridine acid (TPA). The CFD fluorophores were synthesized by a simple one pot melt condensation reaction consistent with the above description in Example 1 without the use of any catalysts or organic solvents. The resulting molecules were water soluble in addition to being soluble in organic solvents such as ethanol, isopropanol, acetone, tetrahydrofuran (THF), and dimethylsulfoxide (DMSO). Photoluminescence properties and fluorescence mechanisms were then reviewed as follows.

Figure 1B:
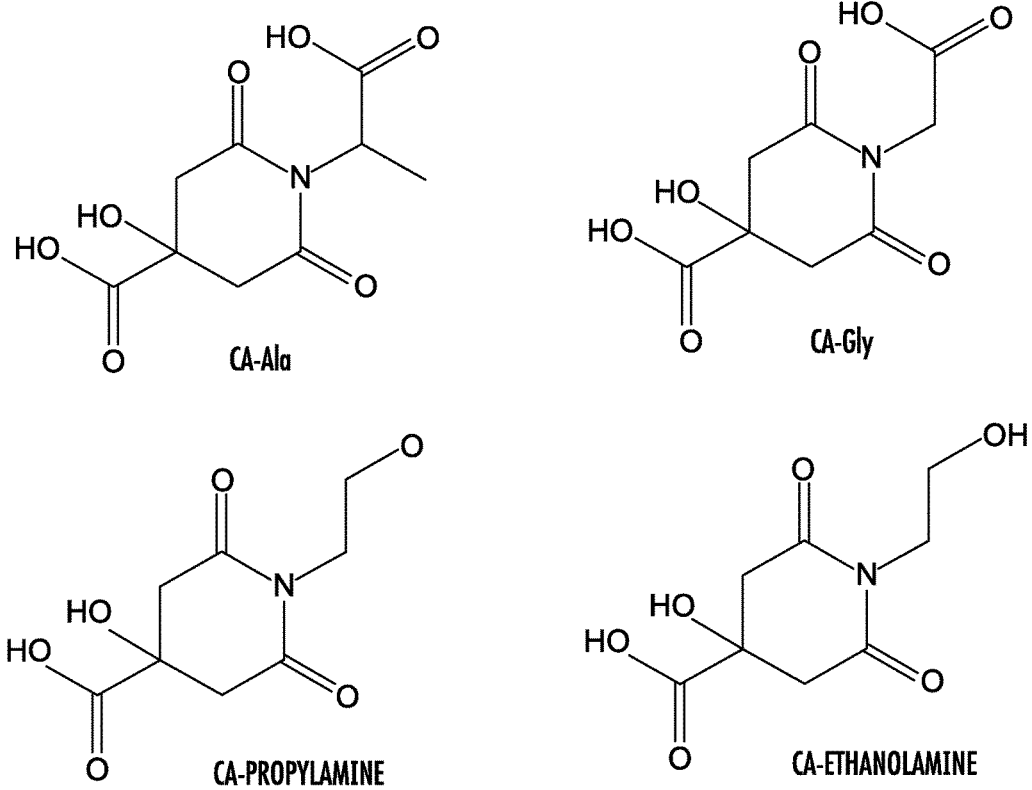

The chemical structures of DPR and TPA were confirmed by $^1$H-NMR and $^{13}$C-NMR and HPLC-MS, exemplified by the CFD from citric acid and alanine (CA-Ala) and CFD from citric acid and cysteine (CA-Cys), respectively. All peaks observed in such techniques were correlated to structures set forth in FIGS. 1A and 1B. The success of CFD synthesis was also confirmed by FTIR and HPLC-MS, and the elution compound of the most dominant fluorescent peak of CFD was further analyzed for ESI-MS. Dominant peaks of 242 (+ve) and 240 (−ve) verified the proposed structure in FIG. 1A. Similar results from ESI-MS spectra of CA-Ala also confirmed the proposed DPR fluorophores.

B. Fluorescence Properties of CFDs

Figure 5:
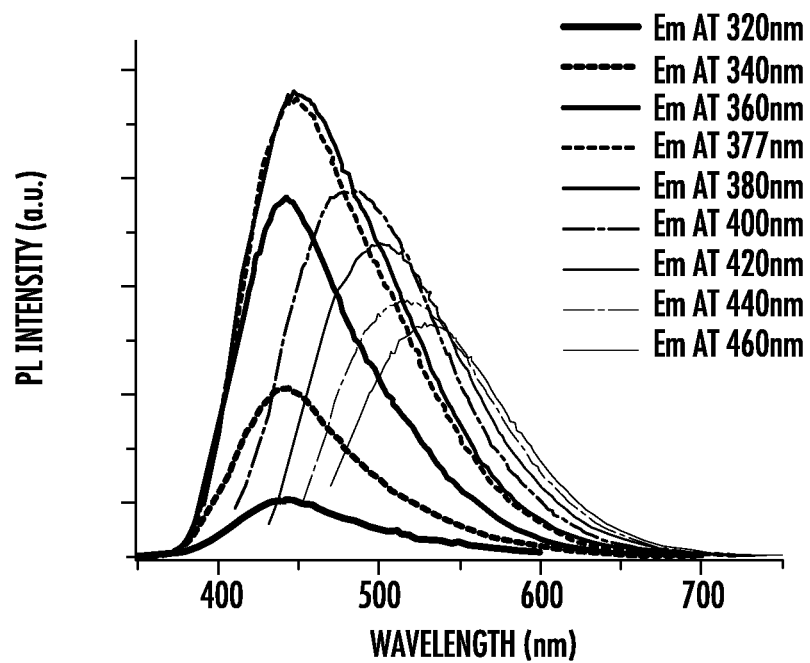
FIG. 5 illustrates emission spectra of a material consistent with embodiments of compositions described herein and/or usable in methods described herein.

Each of the CA-Cys, CA-Cysteamine, CA-Ala, CA-Gly, CA-Propylamine, and CA-Ethylenediamine molecules exhibited fluorescent emission. The maximum excitation and emission wavelengths of these molecules are provided hereinabove in Table I alongside the quantum yields of the molecules. In general, TPA fluorophores demonstrate higher quantum yield than DPR fluorophores. The fluorescence emission of CA-Cys and CA-Cysteamine (TPAs) were observed to be stronger than other molecules observed, and were noted as not shifting at differing excitation wavelengths. In contrast, DPR molecules exhibited weaker emission and "shifting" fluorescence emission. These properties are consistent with the emission spectra illustrated in FIG. 5.

Example 3

Synthesis and Characterization of BPLPs

A. Synthesis

A series of BPLPs were synthesized from varying combinations of organic acids, amino acids, primary amines, and 1,8-octanediol (see Table III) in order to identify the fluorophores of BPLPs. (Note: all chiral molecules discussed hereinbelow are L-isomers unless specifically stated otherwise). In Table III below, compound 1 is the aliphatic acid, compound 2 is 1-8-octanediol (for all polymers), and compound 3 is a primary amine, amino acid, or analog of an amino acid. $\lambda_{ab}$ is the maximum absorption wavelength. $\varepsilon$ is the extinction coefficiency. $\lambda_{ex}$ and $\lambda_{ex}$ are the maximum excitation and emission wavelengths. $\Phi$ is the quantum yield.

TABLE III

Summary of synthesis and photophysical properties of BPLPs.

| Compound 1 | Compound 3 | Fluorophore Structure | $\lambda_{ex}$ (nm) | $\lambda_{em}$ (nm) | $\varepsilon$ ($M^{-1}$ $cm^{-1}$) | $\Phi$ (%) | Band Shift |
|---|---|---|---|---|---|---|---|
| TCA | Cysteine | | 366 | 431 | 11.6 | 54.2 | Y |
| TCA | Alanine | | 355 | 423 | 6.1 | 0.2 | Y |
| SucA | Cysteine | NA | NA | NA | NA | 0 | NA |
| SucA | Alanine | NA | NA | NA | NA | 0 | NA |
| CA | Propionic acid | NA | NA | NA | NA | 0 | NA |
| CA | 3-mercaptopropionic acid | NA | NA | NA | NA | 0 | NA |
| CA | Alanine | | 361 | 430 | 79 | 21.2 | Y |
| CA | Arginine | | 382 | 451 | 11.6 | 15.5 | Y |

TABLE III-continued

Summary of synthesis and photophysical properties of BPLPs.

| Compound 1 | Compound 3 | Fluorophore Structure | $\lambda_{ex}$ (nm) | $\lambda_{em}$ (nm) | $\epsilon$ ($M^{-1}$ $cm^{-1}$) | $\Phi$ (%) | Band Shift |
|---|---|---|---|---|---|---|---|
| CA | Asparagine | | 378 | 440 | 35.5 | 23.8 | Y |
| CA | Aspartic Acid | | 356 | 427 | 6.8 | 19.7 | Y |
| CA | Glutamic Acid | | 358 | 423 | 5.1 | 9.1 | Y |
| CA | Glutamine | | 383 | 448 | 102.4 | 7.3 | Y |
| CA | Glycine | | 357 | 434 | 12 | 39.0 | Y |
| CA | Isoleucine | | 357 | 430 | 5.6 | 17.2 | Y |

TABLE III-continued
Summary of synthesis and photophysical properties of BPLPs.
| Compound 1 | Compound 3 | Fluorophore Structure | $\lambda_{ex}$ (nm) | $\lambda_{em}$ (nm) | $\epsilon$ (M$^{-1}$ cm$^{-1}$) | $\Phi$ (%) | Band Shift |
|---|---|---|---|---|---|---|---|
| CA | Leucine | 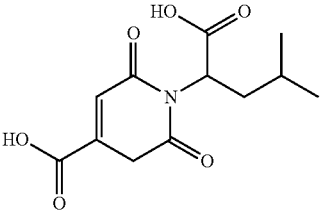 [SMILES: CC(C)CC(C(=O)O)N1C(=O)C=C(C(=O)O)CC1=O] | 359 | 423 | 6.2 | 8.8 | Y |
| CA | Lysine | 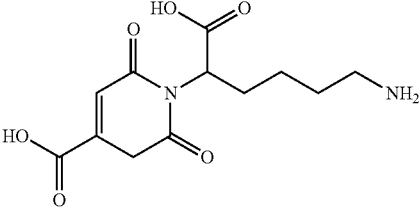 [SMILES: NCCCCC(C(=O)O)N1C(=O)C=C(C(=O)O)CC1=O] | 359 | 431 | 11.4 | 8.6 | Y |
| CA | Methionine | 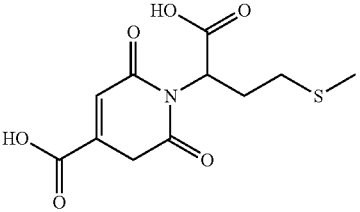 [SMILES: CSCCC(C(=O)O)N1C(=O)C=C(C(=O)O)CC1=O] | 362 | 424 | 5.3 | 10.5 | Y |
| CA | Phenylalanine | 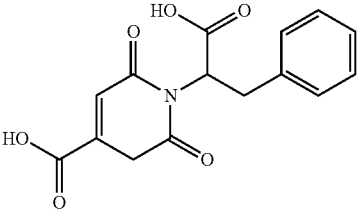 [SMILES: O=C(O)C1=CC(=O)N(C(Cc2ccccc2)C(=O)O)C(=O)C1] | 358 | 423 | 7.8 | 12.7 | Y |
| CA | Serine | 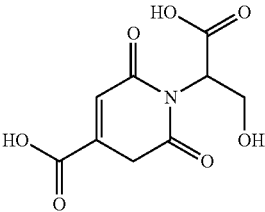 [SMILES: O=C(O)C1=CC(=O)N(C(CO)C(=O)O)C(=O)C1] | 369 | 440 | 437.9 | 4.2 | Y |
| CA | Tryptophan | 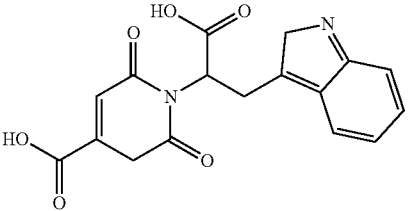 [SMILES: O=C(O)C1=CC(=O)N(C(CC2=c3ccccc3=NC2)C(=O)O)C(=O)C1] | 386 | 445 | 14.6 | 5 | Y |

TABLE III-continued

Summary of synthesis and photophysical properties of BPLPs.

| Compound 1 | Compound 3 | Fluorophore Structure | $\lambda_{ex}$ (nm) | $\lambda_{em}$ (nm) | $\epsilon$ (M$^{-1}$ cm$^{-1}$) | $\Phi$ (%) | Band Shift |
|---|---|---|---|---|---|---|---|
| CA | Valine | | 361 | 428 | 5.3 | 17.5 | Y |
| CA | 3-Aminobutanoic Acid | | 356 | 430 | 6.3 | 8.8 | Y |
| CA | γ-Aminobutyric acid | | 355 | 422 | 4.9 | 22.1 | Y |
| CA | Propylamine | | 359 | 424 | 6.6 | 24.6 | Y |
| CA | Heptylamine | | 356 | 424 | 4.7 | 13.5 | Y |
| CA | Phenylenediamine | | 360 | 433 | 12.1 | 4.5 | Y |

TABLE III-continued
Summary of synthesis and photophysical properties of BPLPs.
| Compound 1 | Compound 3 | Fluorophore Structure | $\lambda_{ex}$ (nm) | $\lambda_{em}$ (nm) | $\epsilon$ (M$^{-1}$ cm$^{-1}$) | $\Phi$ (%) | Band Shift |
|---|---|---|---|---|---|---|---|
| CA | Hexamethylene-diamine | 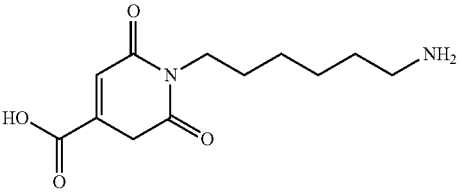 [SMILES: NCCCCCCN1C(=O)C=C(C(=O)O)CC1=O] | 357 | 426 | 9.4 | 11.5 | Y |
| CA | Ethylenediamine | 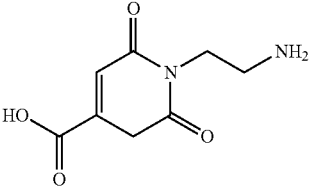 [SMILES: NCCN1C(=O)C=C(C(=O)O)CC1=O] | 377 | 440 | 828.3 | 9.2 | Y |
| CA | ethanolamine | 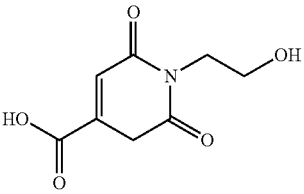 [SMILES: O=C(O)C1=CC(=O)N(CCO)C(=O)C1] | 368 | 419 | 34.6 | 42.1 | Y |
| CA | Cysteine | 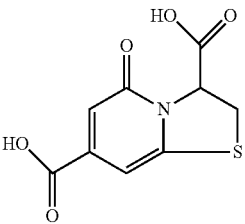 [SMILES: O=C(O)c1cc2n(c(=O)c1)C(C(=O)O)CS2] | 364 | 445 | 8640 | 81.4 | N |
| CA | Cysteamine | 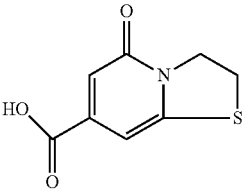 [SMILES: O=C(O)c1cc2n(c(=O)c1)CCS2] | 365 | 445 | 3880 | 79.3 | N |
| CA | Cystine | 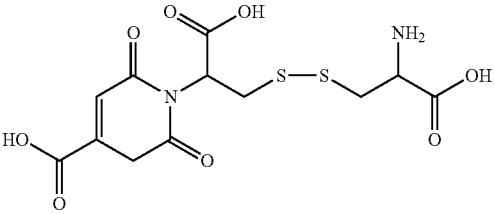 [SMILES: NC(CSSCC(C(=O)O)N1C(=O)C=C(C(=O)O)CC1=O)C(=O)O] | 367 | 430 | 11.6 | 15 | N |
| CA | Homocysteine | 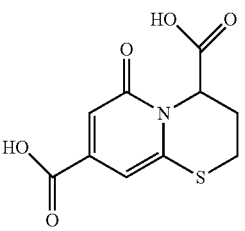 [SMILES: O=C(O)c1cc2n(c(=O)c1)C(C(=O)O)CCS2] | 375 | 445 | 109.2 | 70.8 | N |

TABLE III-continued

Summary of synthesis and photophysical properties of BPLPs.

| Compound 1 | Compound 3 | Fluorophore Structure | $\lambda_{ex}$ (nm) | $\lambda_{em}$ (nm) | $\epsilon$ ($M^{-1}$ $cm^{-1}$) | $\Phi$ (%) | Band Shift |
|---|---|---|---|---|---|---|---|
| CA | Threonine |  | 386 | 436 | 418 | 78.6 | N |
| CA | 2-Aminothiolphenol |  | 396 | 439 | 877.8 | 98.5 | N |
| CA | 4-Aminothiolphenol |  | 396 | 437 | 19.6 | 14.1 | N |
| CA | Penicillamine |  | 369 | 432 | 3180 | 80.6 | N |
| CA | Allylamine | NA | NA | NA | NA | NA | NA |

B. Characterization Methodology

Fluorescence spectra were recorded on a Horiba Fluoro-Max-4 spectrofluorometer (Horiba Scientific, Edison N.J.). All polymer and samples were characterized at a concentration of 2 wt % in 1,4-dioxane and a slit size of 1 nm by 1 nm unless otherwise specified. The fluorescence properties of small molecule dyes were also measure in 2 wt % DI water solutions at same conditions as polymer solutions. BPLPs were also degraded in 1M $K_2CO_3$ solution at 37° C. for 24 hours and then neutralized with 1N HCl solution to pH7. The resulting degradation solutions were subject to further PL characterizations. Quantum yields were also determined on the same spectrofluorometer by using a Quantum-φ integration sphere (Horiba Scientific, Edison N.J.) at the same concentration and slit size with the blank solvent as the reference. Photostability of small molecules and polymers were determined by monitoring the emission intensity decay at their max. Excitation and emission wavelengths over 3 hours of continuous lumination in the spectrofluorometer.

To investigate the fluorescence mechanisms of different fluorophores and the fluorescence "shifting" behavior, a closer look was taken at CFDs with TPA and DPR fluorophores. All polymers with TPA fluorophores possess a relatively higher quantum yield and shorter Stokes shift, while the maximum emission wavelength does not move with different excitation wavelengths. And DPR fluorophores demonstrate a relatively lower quantum yield and larger Stokes shift, as well as emission "shifting" with different excitation wavelengths. Succinic acid (SucA) and Tricarballylic acid (TCA) were also used to replace citric acid to react with various primary amines, since they have possibility to form DPR similar structures (although less conjugated). All non-shifting TPA-based CFDs have higher quantum yield (>30%). In contrast, all shifting DPR (or similar) based CFDs have large Stokes shift (>55 nm) and lower quantum yield (<30%). Typically, longer Stokes shift suggesting more variable energy levels at the ground stage $g_0$. Not intending to be bound by theory, since DPR is not a conjugated structure, the chemical bonds are less rigid and movable suggesting more possibilities at the ground stage $g_0$. Thus, the variable ground stages that lead to larger Stoke shift could cause the fluorescence "shifting" of DPR molecules.

Photostability of CFDs was characterized thereafter, since traditional organic dyes suffer from photobleaching. Various CFDs were tested under their maximum excitation and emission wavelengths for 3 hours, and the photoluminescence was normalized to the initial intensity.

C. Characterization of BPLPs

Figure 6A:
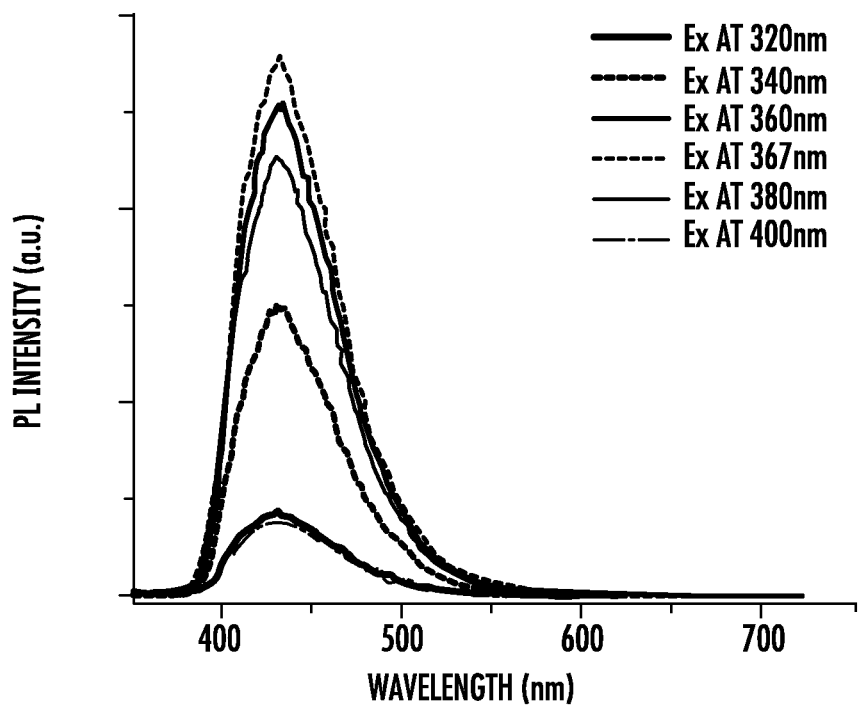
FIGS. 6A and 6B illustrate emission spectra of materials consistent with embodiments of compositions described herein and/or usable in methods described herein.

Among all BPLPs characterized, the BPLP synthesized from citric acid, 1,8-octanediol, and cysteine (i.e. BPLP-Cys) demonstrated the highest fluorescence emission intensity and quantum yield. The emission peak of BPLP-Cys remains fixed at 430 nm independent of the wavelength of excitation. Stated otherwise, BPLP-Cys does not demonstrate band-shifting, which is defined as fluorescence emission peak shift with differing excitation wavelengths. FIG. 6A illustrates emission spectra of BPLP-Cys under different excitation wavelengths. This phenomenon is consistent with most traditional fluorescent materials where fluorescence results from the electronically excited singlet state at the lowest energy level relaxing to the ground state (Kasha's Rule).

Figure 6B:
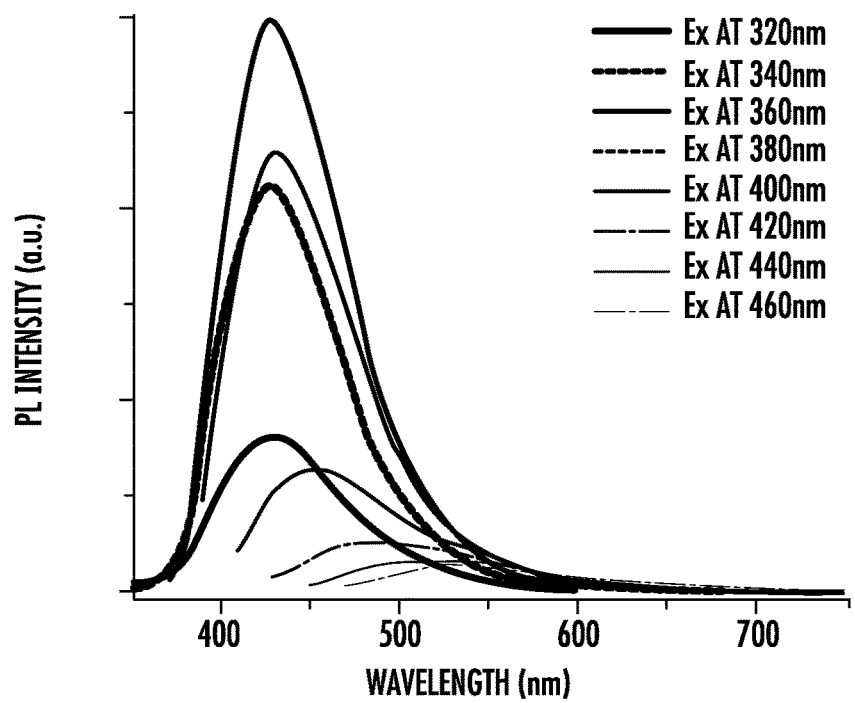
Figure 7:
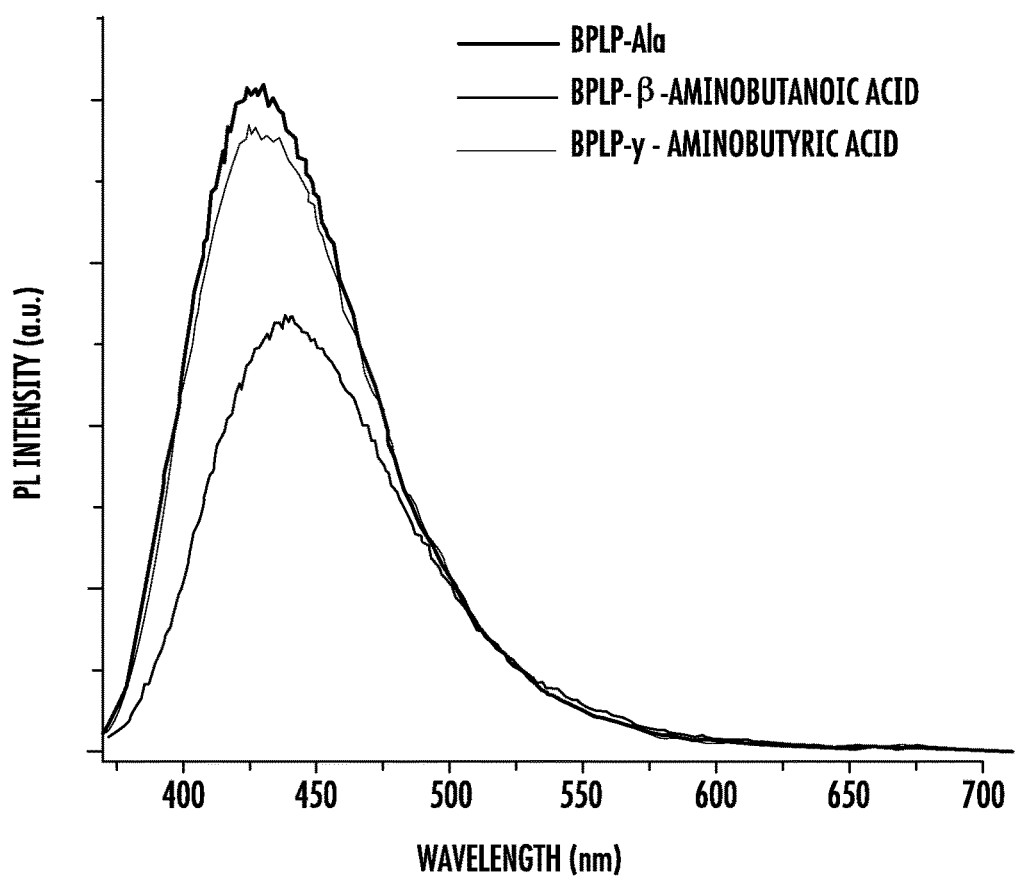
FIG. 7 illustrates emission spectra of a material consistent with embodiments of compositions described herein and/or usable in methods described herein.
Figure 8:
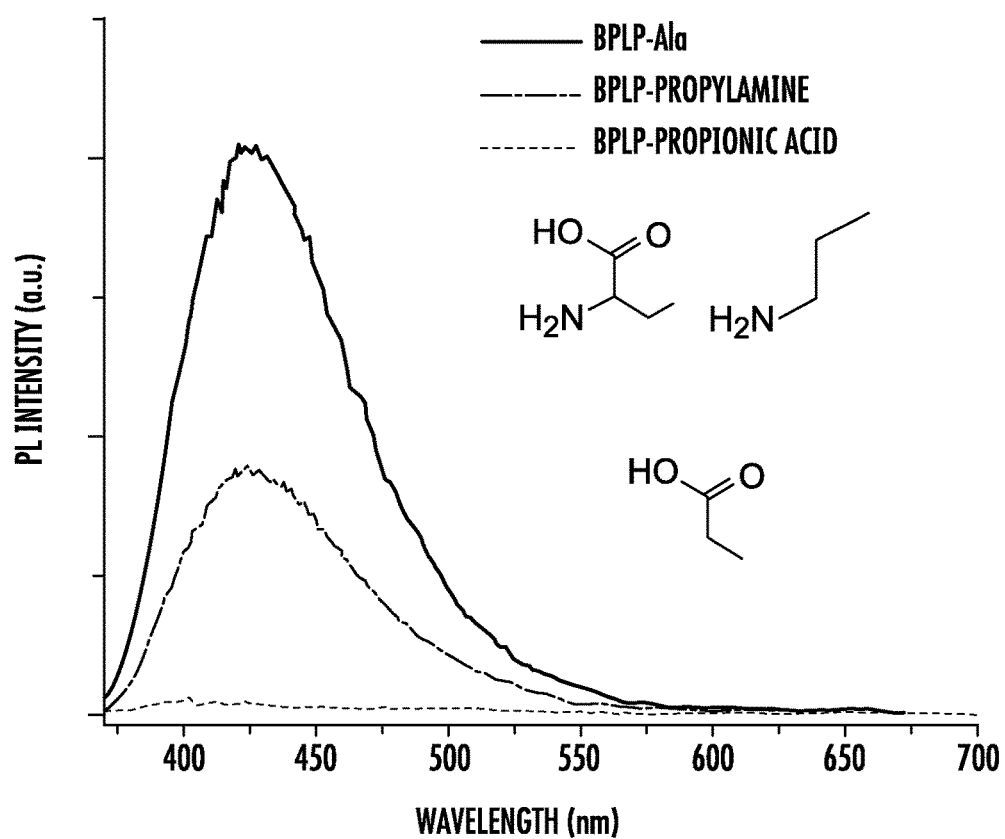
FIG. 8 illustrates emission spectra of materials consistent with embodiments of compositions described herein and/or usable in methods described herein.

The cysteine was replaced with other thiol amines including homocysteine, cysteamine, and penicillamine. As an example, the emission spectra for the resulting BPLP-Cysteamine compared to that of BPLP-Cys is illustrated in FIG. 8. Similar to BPLP-Cys, strong fluorescence emissions without band shifting were observed. In contrast, all other BPLPs including BPLP-Serine (BPLP-Ser), BPLP-Alanine (BPLP-Ala), BPLP-Glycine (BPLP-Gly), and BPLP-propylamine show excitation dependent emission spectra, referred to as "band shifting behavior." FIG. 6B illustrates emission spectra of BPLP-Ala under different excitation wavelengths. FIG. 7 illustrates maximum emission spectra of BPLPs with citric acid, 1,8-octanediol, and α, β, and γ-amino acids respectively.

Figure 6C:
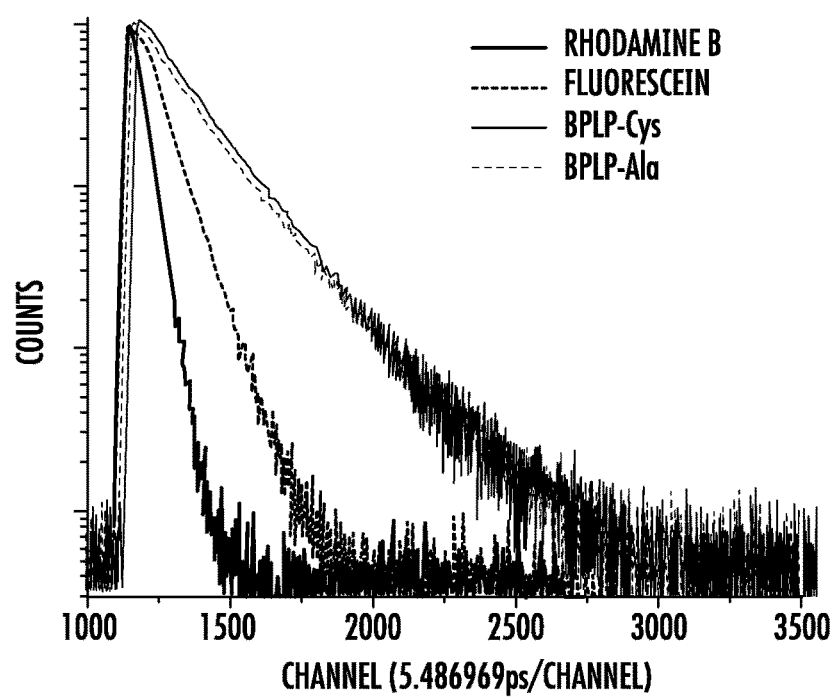
FIG. 6C illustrates a fluorescence intensity-time trace of materials usable in methods described herein.

Based on the above results, and not intending to be bound by theory, it is believed that BPLPs can be distinguished by different band-shifting behaviors and quantum yield levels into two classes of fluorophores with unique fluorescent properties and chemical structures. Further investigation was undertaken to determine whether the two classes could be distinguished by fluorescence lifetime. FIG. 6C illustrates fluorescence intensity-time traces of BPLP-Cys, BPLP-Ala, Fluorescein and Rhodamine B after pulsed excitation at 352 nm and detected at their maximum emission wavelengths. As illustrated by FIG. 6C, BPLPs demonstrated longer fluorescence decay than those of other organic dyes such as Rhodamine B and Fluorescein. The fluorescence lifetime decay of BPLP-Cys can be fitted to a one-exponential decay, resulting in a lifetime of $\tau$=9.80 ns. However, the lifetime decay of BPLP-Ala cannot be properly fitted by one or two-exponential decay, suggesting the presence of multiple energy levels that can emit fluorescence. A three exponential model properly fits the lifetime decay, resulting in $\tau_1$=0.90 ns, $\tau_2$=5.80 ns, and $\tau_3$=9.03 ns. Again, not intending to be bound by theory, these observations support a finding that BPLPs consist of two classes of fluorophores that can be distinguished by their unique photoluminescent behaviors.

D. Assessment of Molecular Basis of Photoluminescence

The molecular basis of BPLP photoluminescence was reviewed by exploring the chemical structures that contribute to its fluorescence. Since three monomers, i.e. citric acid, aliphatic diol, and an amino acid are used to synthesize BPLPs, the role of each monomer in establishing the fluorescent moiety of BPLPs was investigated. Not intending to be bound by theory, it was determined that the type and amount of the aliphatic diols, including both hydrophobic (e.g., 1,8-octanediol) and hydrophilic diols (e.g., polyethylene glycol), are not essential to BPLP fluorescence. BPLPs with different diols emitted fluorescence with only slight changes in intensity and wavelength. Thus, all BPLPs discussed in this study were synthesized with a representative diol, 1,8-octanediol. Precluding the influence of the diol, it was believed that the fluorophore of BPLP is formed between citric acid and the third compound in the polymerization. Previously, only α-amino acid was used as the third compound to synthesize BPLPs. When the α-amino acid was replaced with β and γ-amino acids, similar fluorescent emission was observed (see FIG. 7). Moreover, the carboxyl group of amino acids did not seem to contribute to fluorescence, as BPLPs formed from propylamine and cysteamine demonstrated fluorescence similar to that of BPLP-Ala and BPLP-Cys respectively (FIG. 8). Not intending to be bound by theory, these results suggest that the amine-containing compound used for BPLP syntheses need not be an α-amino acid. The role of the amine group was reviewed by synthesizing BPLPs with propionic acid or 3-mercaptopropionic acid, which lack the primary amine group of alanine and cysteine respectively. No fluorescence was observed however (FIG. 8).

Figure 9:
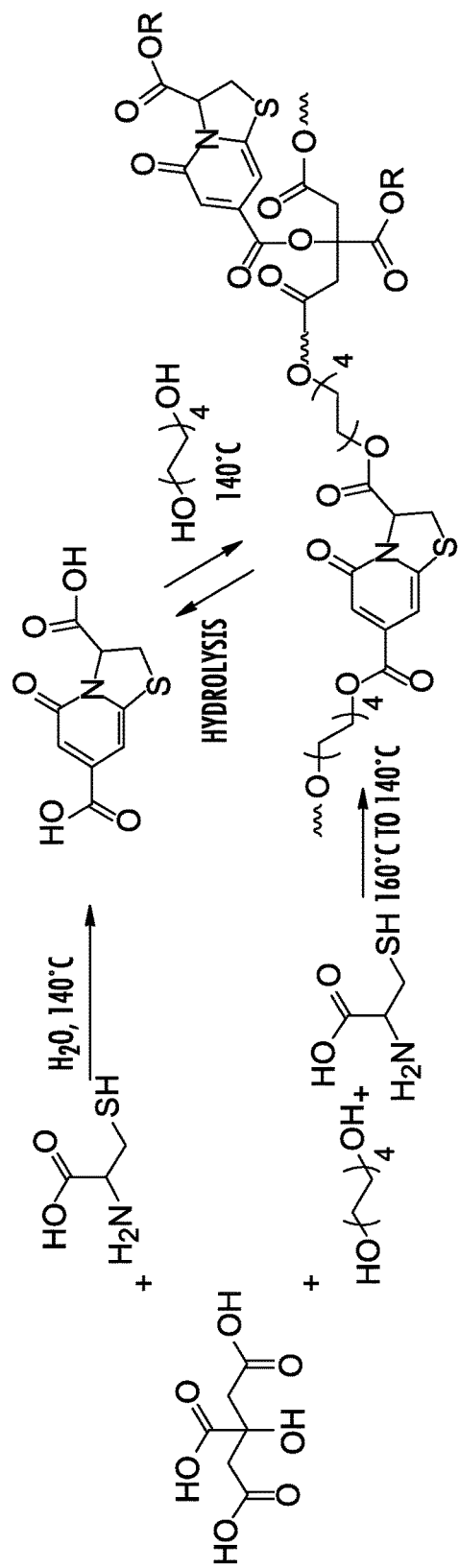
FIG. 9 illustrates a synthesis scheme of a material consistent with embodiments of compositions described herein and/or usable in methods described herein.
Figure 10:
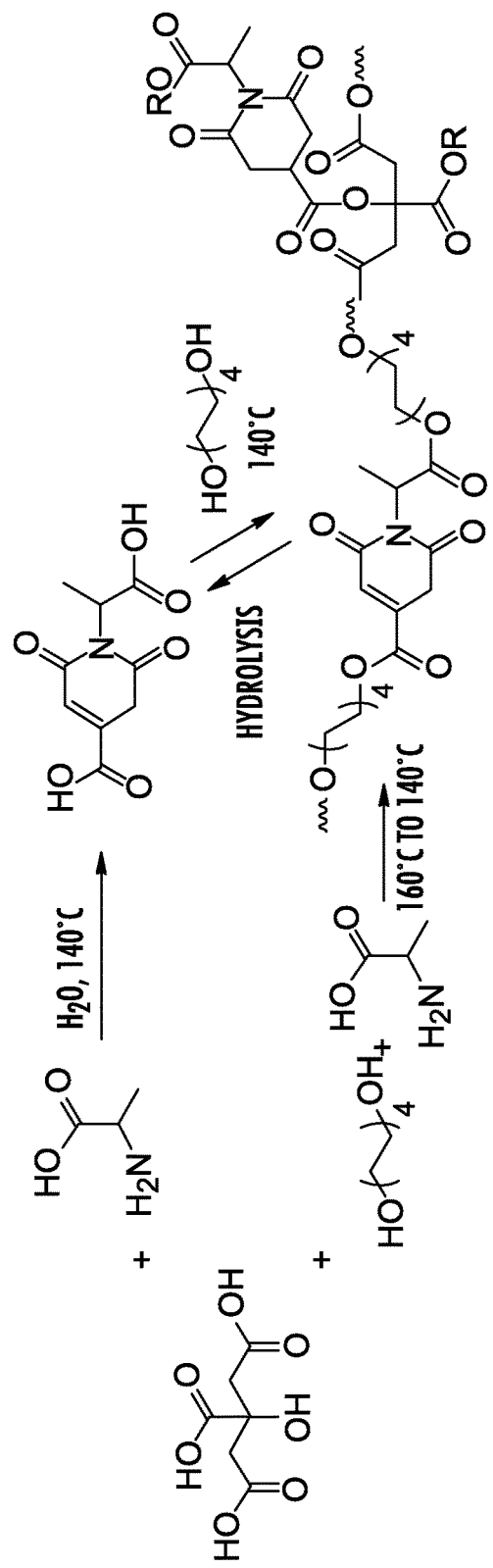
FIG. 10 illustrates a synthesis scheme of a material consistent with embodiments of compositions described herein and/or usable in methods described herein.

To investigate the role of citric acid, tricarballylic acid (TCA) and succinic acid (SucA) were selected to replace citric acid to react with 1,8-octanediol and alanine or cysteine. BPLP-TCA-Ala, BPLP-SucA-Ala, BPLP-TCA-Cys, and BPLP-SucA-Cys all exhibited negligible fluorescence compared to BPLP-Ala and BPLP-Cys respectively, suggesting that in addition to three carboxyl groups, the hydroxyl group in citric acid may be needed to form the fluorophores of BPLPs. Finally, the diol was removed from the polymer reaction as it was discovered that diols' contribution to fluorescence is negligible, thus enabling the actual fluorophores of BPLPs to be synthesized from merely citric acid and primary amine (FIGS. 9 and 10). The newly formed small molecular fluorophores also can be used as dyes.

Figure 2A:
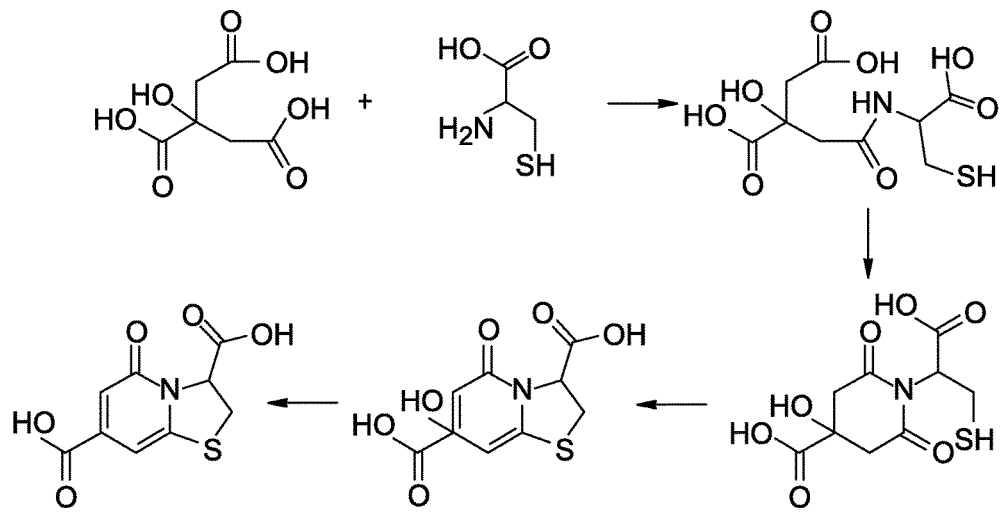
FIGS. 2A and 2B illustrate reaction schemes to form citric acid-derived fluorescent dyes.
Figure 2B:
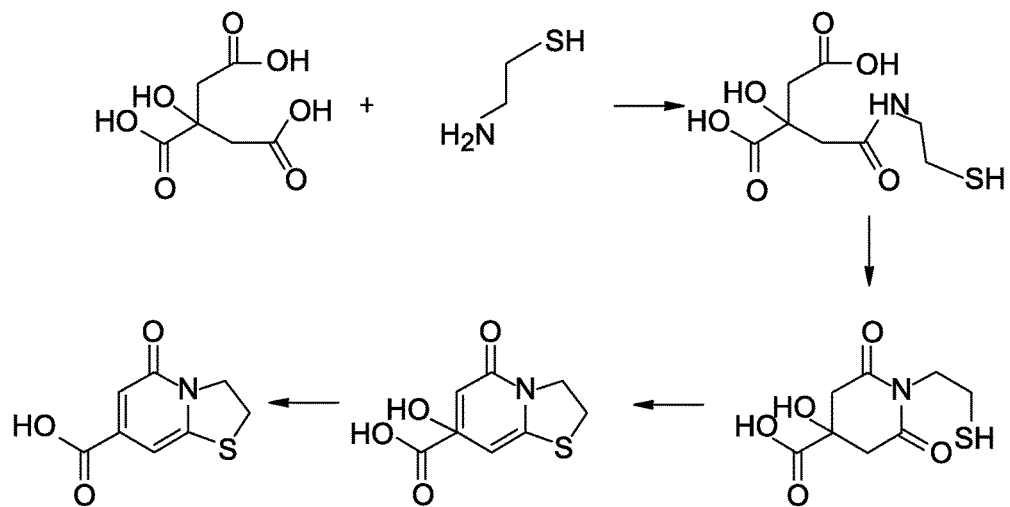
Figure 3A:
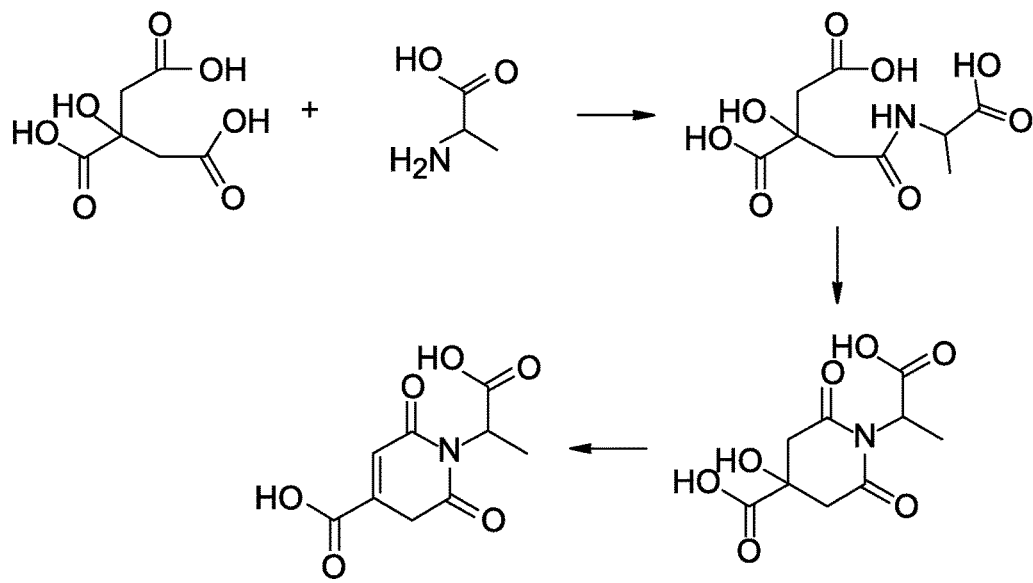
FIGS. 3A and 3B illustrate reaction schemes between citric acid and various materials to form fluorescent dyes.
Figure 3B:
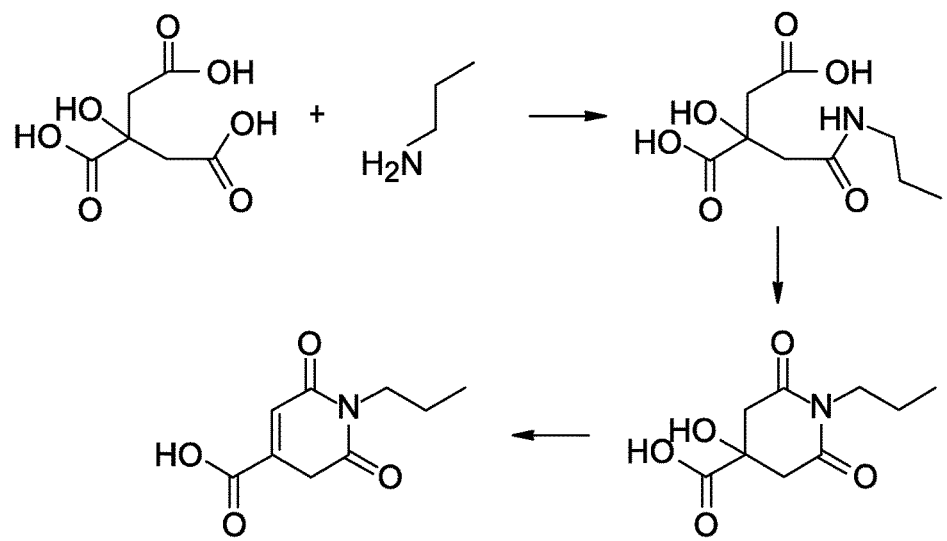
Figure 4:
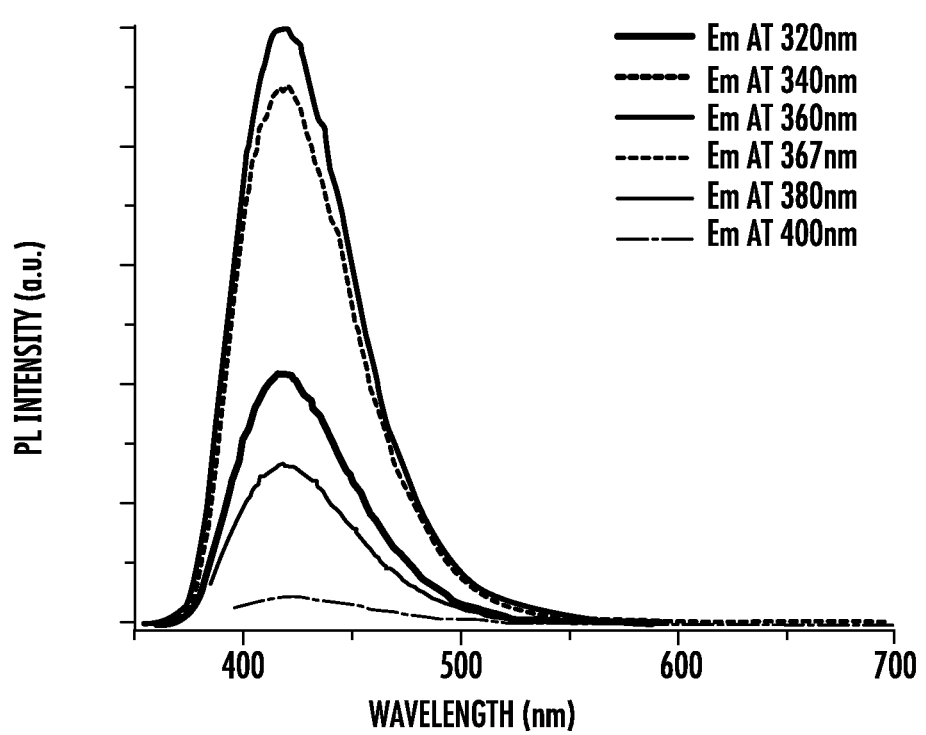
FIG. 4 illustrates emission spectra of a material consistent with embodiments of compositions described herein and/or usable in methods described herein.

From the reactions between citric acid and various primary amines, a new class of water-soluble fluorescent dyes referred to as citric acid-derived photoluminescent dyes (CPDs) was established. This allowed us to further elicit the fluorescent moieties of BPLPs and to better understand the characteristics and behaviors of the two classes of BPLPs mentioned earlier. As examples, the dye synthesized from the reaction of citric acid and cysteine is referred as CA-Cys; the dye synthesized by reacting citric acid and alanine is referred as CA-Ala. Chemical structures of all CPDs were identified by $^1$H-NMR, $^{13}$C-NMR, HPLC-ESI-MS, and FTIR. For CA-Cys, equimolar amounts of citric acid and cysteine were reacted, resulting in a thiazolo pyridine carboxylic acid (TPA) (5-oxo-3,5-dihydro-thiazolopyridine-3, 7-dicarboxylic acid) (FIG. 2A). CA-Cys showed strong fluorescence with quantum yields as high as 81% and a high extinction coefficient of 8640 $M^{-1}$ $cm^{-1}$, but no fluorescence band shifting was observed (FIG. 4). CA-Cysteamine exhibited similar photoluminescent behavior.

Figure 11:
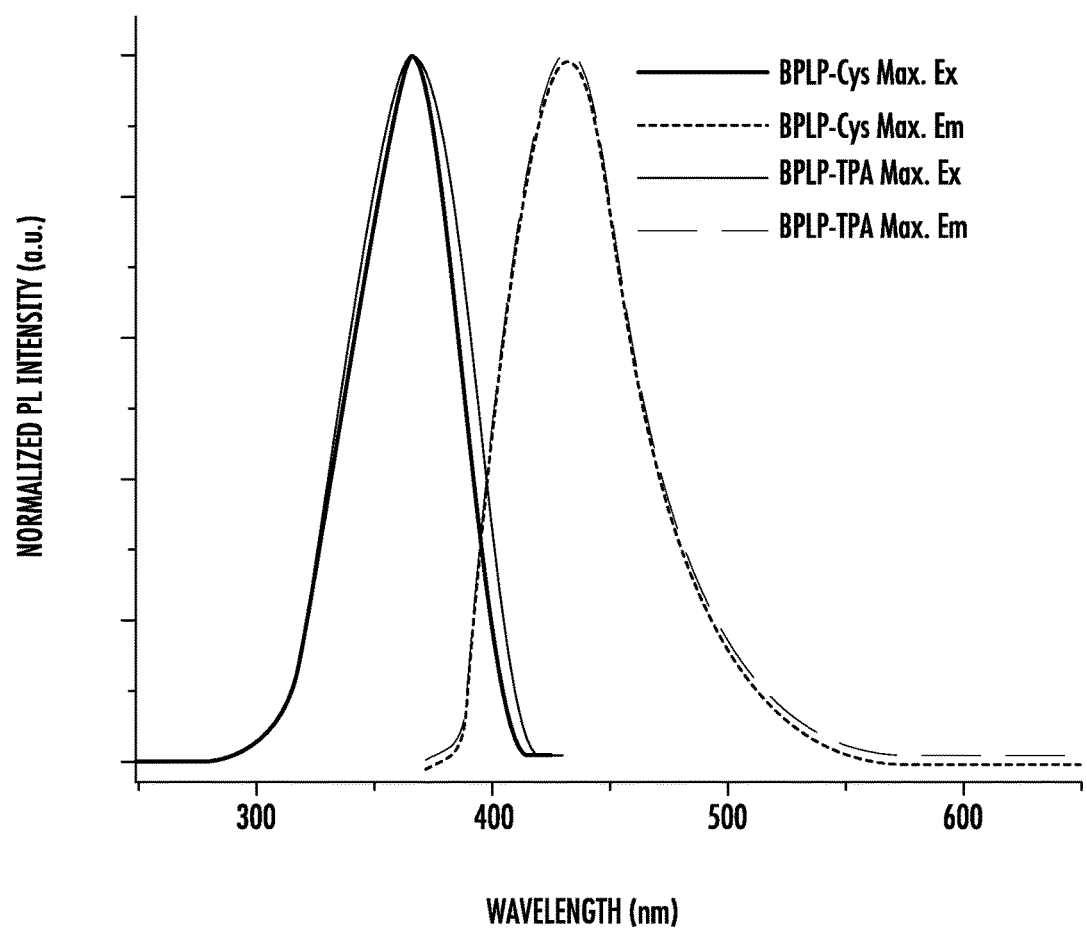
FIG. 11 illustrates emission spectra of a material consistent with embodiments of compositions described herein and/or usable in methods described herein.

The aromaticity of TPA molecules was calculated based on two established models, nucleus independent chemical shift (NICS), and Harmonic Oscillator Model of Electron Delocalization (HOMED), which is a modified model based on the Harmonic Oscillator Model of Aromaticity (HOMA) for heterocyclic structures. The class of TPAs including CA-Cys, CA-Cysteamine, and CA-Homocysteine all demonstrated high aromaticity with HOMED>0.75 and NICS<−3.0 (Table 3). Thus, the fluorescence mechanism of TPAs seems to resemble that of most organic fluorescent dyes whose fluorescence results from π-π* electronic excitation leading to emission from the lowest excitation band, resulting in fluorescence obeying Kasha's rule without the band shifting behavior. To establish that the TPA structure is indeed the fluorescent moiety of BPLPs, synthesized polymers were synthesized by reacting purified TPA with 1,8-octanediol. The PL properties of the resultant BPLP-TPA were identical to that of BPLP-Cys synthesized by reacting citric acid, 1,8-octanediol, and cysteine directly (FIG. 11), including a lack of band-shifting (FIG. 6A). To further verify that TPA is the fluorophore of BPLP-Cys, BPLP-Cys was hydrolyzed in base solution and the HPLC-MS analysis on the fluorescent fraction of the degradation product solutions reaffirmed the TPA structure.

E. Assessment of Band Shifting

The mechanism behind the observed band shifting phenomenon common in DPRs and DPR based polymers was investigated. Not intending to be bound by theory, some reports attribute band shifting phenomena in fluorophores to the "red edge effect", where the presence of rotating auxochromic groups generates additional dipole interactions between the fluorophore and solvent during intersystem relaxation, prolonging solvation time to the approximate timescale of fluorescence emission (i.e. lifetime of the fluorophore). This longer solvation time further relaxes the excited state to various lower energy levels, resulting in red-shifting of emissions and multiple lifetimes such that a greater red-shift occurs with increasing solvent polarity.

It was desired to demonstrate correlation between the extent of the red-edge effect and solvent polarity to prove that DPR's dynamic band shifting is indeed generated by the red-edge effect. To achieve this, solvent-dependence studies were performed to evaluate how solvent polarity influences DPR's relaxation kinetics as measured by the extent of band shift and fluorescence lifetimes. The extent of band shift (i.e. intensity of emission at longer wavelengths) is shown to increase with solvent polarity, as the band-shift effect of CA-Ala is strongest in water (dielectric constant $\varepsilon=80.1$), moderate in acetone ($\varepsilon=20.7$), and minimal in non-polar solvents such as dichloromethane ($\varepsilon=8.93$). The general trend of fluorescence lifetime decays indicates that the lifetimes of CA-Ala decrease with increasing solvent dielectric constants, indicating longer solvation times in polar solvents. Interestingly, when fluorescence lifetime decays of CA-Ala were collected at different emission wavelengths, the decay plots varied significantly in water, changed slightly in acetone, but remained relatively constant in dichloromethane. As the fluorescence emission wavelengths represent the band edge energy levels that are corresponding to the permitted timescale of solvent relaxation, the lifetimes of CA-Ala in nonpolar solvents seem oblivious to the permitted timescale of solvation, while lifetimes in polar solvents respond dynamically to the extent of solvent relaxation. Both studies indicated that DPR's relaxation kinetics is largely influenced by its dipole alignments in response to polar solvents. Therefore, again not intending to be bound by theory, it was concluded that the band shifting of DPR is caused by the red-edge effect, which is ultimately governed by fluorophore/solvent interaction.

Besides above-discussed photoluminescent behaviors, CPDs are also advantageous in two more aspects: high photostability and long lifetimes. Just as high photostability was found in BPLPs, CA-Cys was also found to be extremely stable with 95% fluorescence remaining after continuous UV excitation for 3 hours, while DPRs such as CA-Ala showed photobleaching on par with Fluorescein but more resistant than Rhodamine B. Once excited by a pulsed laser, CPDs, including both CA-Cys and CA-Ala, exhibited longer emission decays than traditional organic dyes Rhodamine B and Fluorescein. Likewise, similar to that of BPLP-Cys, CA-Cys' fluorescence time trace curves can be fitted by a one-exponential fitting, giving a fairly long lifetime of $\tau=10.46$ ns. For CA-Ala, three-exponential fitting was again necessary, resulting in $\tau_1=0.95$ ns, $\tau_2=4.44$ ns, and $\tau_3=10.35$ ns. As comparison, Rhodamine B and Fluorescein have lifetimes of 1.75 ns and 4.19 ns respectively, which are considerably short for fluorescence lifetime imaging (FLIM) purposes. FLIM's utility in the bioimaging field stems from avoidance of tissue auto-fluorescence by imaging the lifetime window after the first 0.5-2.5 ns. Thus, not intending to be bound by theory, the long lifetimes of BPLPs and CPDs may enable FLIM application for imaging biological tissues and molecules.

In view of the above, new polymers have been designed with stronger fluorescence emissions and higher quantum yields. 2-aminothiolphenol (2-ATP) was reacted with citric acid and 1,8-octanediol to create BPLP-2-ATP, which was degradable and strongly fluorescent. The fluorescence was strong enough to be observed by naked eye, under white light against a dark background. The quantum yield of BPLP-2-ATP is as high as 98.5% with a small Stokes Shift of 43 nm due to the formation of a conjugated 3-ring benzothiazolopyridine fluorophore.

Moreover, longer emission wavelengths are often desired for imaging purposes. Thus, this can take advantage of the red-edge effect of the DPR fluorophores. For example, a water-soluble BPLP-Ala (WBPLP-Ala) was synthesized by replacing the 1,8-octanediol with PEG, achieving a stronger band shifting effect to longer wavelengths. Compared to the spectra of BPLP-Ala in FIG. 6B, the relative PL intensity of WBPLP-Ala is much stronger at longer emission wavelengths, likely due to WBPLP-Ala being tested in water compared to the less polar 1,4-dioxane that was used to dissolve BPLP-Ala. These findings may further expand the applications of BPLPs and CPDs in biomedical and optical fields.

Again not intending to be bound by theory, it is believed that the fluorescence mechanism of citric acid based fluorescent materials, including biodegradable photoluminescent polymers (BPLPs) and citric acid-based photoluminescent dyes (CPDs) can be set forth as follows. The class of BPLPs was expanded from those strictly based on α-amino acid—to all primary amines. Two types of CPD fluorophores were found—namely TPAs and DPRs—which are responsible for the luminescence of BPLPs. TPAs are fluorophores with conjugated/planar structures, high quantum yields, exceptional photostability, and a lack of band shifting, while the DPRs are unique fluorophores that do not contain traditionally recognized aromaticity for fluorescence. The fluorescence of DPRs is grounded upon the tertiary amine with two carbonyl bonds pulling the lone pair electron. DPRs display band shifting behavior and dynamic Stokes Shifts in polar solvents due to the red-edge effect from rotatable auxochromic groups. Time resolved fluorescence spectra revealed long average lifetimes of BPPLs and CPDs in the range of 6-12 ns. The DPRs and corresponding polymers also exhibit multiple lifetimes in polar solvents. The new findings in the unique fluorescence mechanisms of BPLPs and CPDs are significant in designing and conveniently synthesizing new luminescent materials with high yield and purity for optical imaging, FLIM, cancer diagnostics, and biosensing and may also facilitate the search for fluorescence mechanism of other PL materials such as PAMAM and carbon dots.

BPLPs were synthesized according to the previous method. Briefly, citric acid (or tricarballylic acid, succinic acid), 1,8-octanediol, and one of amino acids or amines (molar ratio 1:1:0.2) were reacted in a flask at 140° C. under nitrogen for 2 hours. Upon the end, 1,4-dioxane was added to terminate the reaction and dissolve the resulting polymer, followed by precipitation in DI water and lyophilization. Small molecular fluorophores were synthesized by adding citric acid (or tricarballylic acid, succinic acid) and one of amino acids or primary amines at 1:1 molar ratio into 10 mL DI water. The reaction was conducted at 140° C. under vacuum for 4 hours and terminated by adding cold DI water. The product was purified by recrystallization in DI water three times or a preparative HPLC with a Shimadzu HPLC system equipped with a C18 column and a fraction collector.

F. In Vitro Cytocompatibility and Cell Labeling

The in vitro toxicity of CFDs was evaluated by incubating them with NIH 3T3 mouse fibroblasts at different concentrations. CA-Ala and CA-Cys showed excellent cytocompatibility with no significant decrease in cell viability at a dosage as high as 1000 μg/ml. However, a significant decrease (p<0.01) of cell viability was observed at 2500 μg/ml compared to control. Therefore, CFDs are generally biocompatible fluorescent compounds that can be used at a high dosage. To demonstrate fluorescence labelling of CFDs, CA-Cys was incubated with 3T3 cells at 500 μg/ml for 24 hours and imaged by confocal microscopy. Strong fluorescence was observed from 3T3 cells with CA-Cys uptaken in DAPI, FITC, and Cy3 channels. The red fluorescence was relatively weak since CA-Cys has relatively weak red fluorescence emission.

Example 4

Luminescent Compositions for Sensing, Detection, and Imaging

A. Methods

Synthesis of Citric-Acid Based Fluorescent Dyes.

As discussed herein above, citric acid-based fluorescent dyes have been synthesized via a one-pot reaction of citric acid and a primary amine compound dissolved in water or organic solvents. In the case of CA-Cys synthesis, equimolar ratios of citric acid and L-cysteine were added to a round-bottom flask with just enough distilled water to dissolve both compounds. The reaction took place under 140° C. for 30 minutes, and was terminated by adding 10 mL of DI water in order to dissolve the products. Purification was performed through two cycles of crystallization in DI water and freeze-drying. For CA-Ala, the synthesis procedure was similar, however, the purification was done by preparative high-pressure liquid chromatography. The CFD chemical structures were determined by, HPLC-ESI-MS, FTIR, $^1$H and $^{13}$C NMR.

Synthesis of Water-Soluble Polymers with CFDs.

Water-soluble biodegradable photoluminescent polymers (WBPLPs) were synthesized according to our previous method. Citric acid, a primary amine compound, and PEG-200 were added at molar ratios of 1:0.2:1 and melted in a round-bottom flask at 160° C. Once melted, the reaction continued under 140° C. for 3 hours under vacuum, quenched with water, and purified through dialysis (500 Da membrane) for 48 hours.

Fluorescence Measurements.

Absorbance Spectra were recorded on Tecan Infinite M200 Pro UV-vis spectroscopy, and fluorescence spectra were recorded on Horiba FluoroMax-4 fluorospectroscopy at concentrations below 0.1 O.D. unless otherwise indicated. Quantum Yields were measured on the Quantum φ Integrating Sphere accessory to the FluoroMax-4, while lifetime measurements were determined through the Time-Correlation Single Photon Counting (TCSPC) accessory to the FluroMax-4. TCSPC was utilized in conjunction with NanoLED pulsed diode light source with peak excitation wavelength at 352 nm and at 10,000 counts peak preset. Emission was collected at the fluorescence $\lambda_{max}$, unless otherwise indicated. For all pH-dependence experiments, sample pH was adjusted with sulfuric acid or sodium hydroxide. For all chloride-dependent quenching experiments, magnesium chloride hexahydrate (Sigma Aldrich) was used.

Acid-Base Titration.

The pKa values of CA-Cys were determined through acid-base titration with NaOH. Titration curves support the presence of two carboxyl groups with close pKa values for two reasons. The molar mass of CA-Cys, 241 g/mol as determined by LC-ESI-MS, matches the molar mass value of 245.6 g/mol determined by titration only when assuming a diprotic acid. Moreover, the long buffered region of the titration curve supports the presence of two carboxyl groups with close pKas that are overlapping the first inflection point, estimated to be at ½ NaOH volume of the end point. Hence, $pKa_1$ and $pKa_2$ were assumed to be the pH at ¼ and ¾ volumes of the final inflection point respectively.

Determination of a Theoretical Protolytic Equilibrium for Diprotic Acids.

Based on the pKa values determined from 2.4, a theoretical protolytic equilibria was established based on equations 1-3 below:

$$\% \text{ of Dye in Neutral State} = \frac{[H^+]^2}{[H^+]^2 + K_{a1}[H^+] + K_{a12}} \quad \text{Equation 1}$$

$$\% \text{ of Dye in Anion State} = \frac{K_{a1}[H^+]}{[H^+]^2 + K_{a1}[H^+] + K_{a12}} \quad \text{Equation 2}$$

$$\% \text{ of Dye in Dianion State} = \frac{K_{a12}}{[H^+]^2 + K_{a1}[H^+] + K_{a12}} \quad \text{Equation 3}$$

$$\text{where } K_{a1} = \frac{[H^+][HA^-]}{[H_2A]} \text{ and } K_{a12} = \frac{[H^+]^2[HA^{2-}]}{[H_2A]}$$

To determine the protolytic equilibria at different concentration, equation 4 below was used to determine [H$^-$] based on the input concentration ($C_a$) and acid dissociation constants:

$$[H^+]^2 - \frac{C_a(K_{a1}[H^+]^2 + 2K_{a12}[H^+])}{[H^+]^2 + K_{a1}[H^+] + K_{a12}} - K_w = 0 \quad \text{Equation 4}$$

Fluorescence Lifetime Analysis.

Fluorescence lifetime decays were fitted with an exponential series according to equation 5 below:

$$F(t) = A + B_1 \exp\left(\frac{t}{T_1}\right) + B_2 \exp\left(\frac{t}{T_2}\right) + B_3 \exp\left(\frac{t}{T_3}\right) + \ldots \quad \text{Equation 5}$$

Where F(t) is the lifetime decay function with respect to time t, $T_i$ is the lifetime value of the emitting species, A is the background offset, and $B_i$ is the pre-exponential function of the emitting species. If the lifetime decay is dominated by one emitting species, the equation can be simplified to include only the first two terms. $B_f$ measures the relative amplitude of the specified fluorophore, where the percent contribution of the fluorophore to the lifetime decay, f, is derived from equation 6:

$$f = \frac{B_1 T_1}{\sum B_1 T_1} \qquad \text{Equation 6}$$

The method of least squares was used to quantify $\chi^2$ based on the decay data and the fitting function, where $\chi^2$ values under 1.2 indicates a good fit, and values above 1.2 indicate need for additional terms in equation 5. Typically, an additional exponential term was necessary to improve the $\chi^2$ value and account for the presence of a negligible 6 ns species, deemed to stem from by-products of CFD synthesis, impurities, or CFD dimers. Since the contribution from this species was minor, often less than 5%, it was not included in lifetime analysis.

Stern-Volmer Plots.

When a fluorophore of [F] absorbs light energy, excitation raises a sub-population of [F] to the excited state, [F*], which then rapidly lose energy along radiative relaxation ($k_r$) or non-radiative relaxation ($k_{nr}$) according to equation 7. If a quencher forms a complex with the excited fluorophore, an extra non-radiative component, $k_q$, is added to equation 7 to account for the additional relaxation pathway that is a function of quencher concentration and its association constant.

$$\frac{d[F^*]}{dt} = -k_r[F^*] - k_{nr}[F^*] - k_q[Q][F^*] \qquad \text{Equation 7}$$

In lifetime measurements, equation 8 is given in the exponential form:

$$[F^*] = [F^*]_0 e^{-(k_r + k_{nr} + k_q[Q])t} \qquad \text{Equation 8}$$

where the quenched and unquenched lifetimes, $\tau$ and $\tau_0$, can be determined through this exponential:

$$\tau = \frac{1}{k_r + k_{nr} + k_q[Q]} \qquad \text{Equation 9}$$

$$\tau_0 = \frac{1}{k_r + k_{nr}} \qquad \text{Equation 10}$$

Thus the quenching of fluorescence can be quantitatively analyzed by comparing the affected lifetimes. The Stern-Volmer (SV) relationship is used to determine $k_q$, the bimolecular quenching rate constant for the diffusion coefficients of the fluorophore and quencher, by deriving a plot of $\tau_0/\tau$ versus [Q]:

$$\frac{\tau_0}{\tau} = \qquad \text{Equation 12}$$

$$\frac{k_r + k_{nr} + k_q[Q]}{k_r + k_{nr}} = 1 + \frac{k_q[Q]}{k_r + k_{nr}} = 1 + k_q \tau_0[Q] = 1 + K_{SV}[Q]$$

Thus the linear slope of the SV plot, $K_{SV}$, measures the efficiency of the quencher. Since sulfuric acid was used to study proton-induced quenching, the pH value was a better indicator of [H$^+$] due to incomplete dissociation of sulfuric acid at high concentrations. In the case of multiple quenchers, as will be discussed in this paper, equation 7 must include additional $k_q$ terms that result in modified form of equation 12 below:

$$\frac{\tau_0}{\tau} = \qquad \text{Equation 13}$$

$$\frac{k_r + k_{nr} + k_{q1}[Q_1] + k_{q2}[Q_2]}{k_r + k_{nr}} = 1 + k_{q1}\tau_0[Q_1] + k_{q2}\tau_0[Q_2]$$

If the two quenchers are act independently, the quencher of known quenching rate and concentration can be combined into the Y-intercept term in order to determine the quenching rate of the second, unknown quencher. The above equations are valid for all dynamic quenching processes, where the fluorophore is unaffected in the ground state, but forms excited state complexes that lead to additional non-radiative pathways, thereby affecting reducing the lifetime, quantum yield, and intensity of the emitting species. For such dynamic processes, the term $\tau_0/\tau$ can be interchanged with quantum yield or intensity ratios ($F_o/F$), giving:

$$\frac{I_o}{I} = \frac{\Phi_0}{\Phi} = 1 + K_{SV1}[Q_1] + K_{SV2}[Q_2] \qquad \text{Equation 14}$$

If the quencher and fluorophore undergo complex formation in the ground state, as in the case of protonation reactions, the number of emitting species in the ground state is reduced, resulting in an overall decrease in intensity. However, once excited, there are no additional non-radiative channels affecting the decay of the emitting species, so fluorescence properties of the emitting species are measured independently of the presence of non-emitting species. Hence lifetime and quantum yield values are identical to the unquenched case, resulting in an SV plot with a slope of 0.

Detection Limits. As the Stern-Volmer equation is a linear representation of the dynamic quenching phenomena, lower limits are essentially bounded by the detection limit of the fluorescence instrument, while upper limits stem from non-linearity in the Stern-Volmer relation which may result from ionic strength effects at particularly high halide concentrations. The lower limit of detection is defined according to desired signal to noise ratio (S/N), defined as the mean of signal strength over its Root Mean Square (RMS) error. When observing fluorescence quenching, the lower limit of detection is bounded by the smallest discernible difference in unquenched versus quenched maximum or integrated fluorescence signals. Hence, the signal is defined as the ratio of the unquenched and quenched fluorescence, while noise is the variability of the maximum peaks from sample to sample, according to the RMS error:

$$\text{Noise} = \text{RMS} = \sqrt{\frac{\sum_{i=1}^{n}(X_i - \overline{X})}{n}} \qquad \text{Equation 15}$$

In addition, signal is defined as:

$$S = I_o - I$$

The Stern-Volmer equation, $I_o/I = 1 + K_{SV}[Q]$, can be used to modify equation (15):

$$S = I_o\left(1 - \frac{1}{(1 + K_{SV}[Q])}\right) \quad \text{Equation 16}$$

When determining the limit of detection, where the signal is defined as the smallest discernible difference between the unquenched and quenched signals, one can assume that the noise of the unquenched signal is approximately equal to the noise of the quenched signal (i.e. as $I \rightarrow I_o$, and $S \rightarrow 0$, then $N \rightarrow N_o$). Thus, the signal to noise ratio is simplified to equation 17:

$$\frac{S}{N} = \frac{I_o}{N_o}\left(1 - \frac{1}{(1 + K_{SV}[Q])}\right) \quad \text{Equation 17}$$

This method is valid for all measurements in physiological pH where proton quenching is not effective. However, in the halide sensing methods listed above where fluorescence is measured at a fixed highly acidic solution, proton quenching results in:

$$S = I_{pH} - I_{pH,Cl} \quad \text{Equation 18}$$

Where $I_{pH,Cl}$ and $I_{pH}$ are both measured at the same pH, with and without chloride respectively, and are defined by the SV equations 19 and 20:

$$\frac{I_o}{I_{pH}} = K_{SV(H+)}[H^+] + 1 \quad \text{Equation 19}$$

$$\frac{I_o}{I_{pH,Cl}} = K_{SV(H+)}[H^+] + K_{SV(Cl-)}[Cl^-] + 1 \quad \text{Equation 20}$$

Dividing equation 20 by 19, $$\frac{I_{pH}}{I_{pH,Cl}} = 1 + \frac{K_{SV(Cl-)}[Cl^-]}{K_{SV(H+)}[H^+] + 1} \quad \text{Equation 21}$$

Thus in highly acidic solutions, equation 17 is modified to:

$$\frac{S}{N} = \frac{I_{pH}}{N_o}\left(1 - \frac{1}{\left(1 + \frac{K_{SV(Cl-)}[Cl^-]}{K_{SV(H+)}[H^+] + 1}\right)}\right) \quad \text{Equation 22}$$

To determine $N_o$ from the RMS error of integrated unquenched fluorescence, data was collected by making 36 mL of CA-Cysteine in distilled water at a final absorbance of 0.10, covered in foil. The first 5 mL of CA-Cysteine was used to rinse the cuvette and to measure the R1 of the fluorometer until the signals stabilized (kinetics, measured every minute for roughly 20 minutes). Three preliminary fluorescence measurements were run with the rinse solution to ensure signal consistency. Next, 10×3.000 mL samples of CA-Cysteine were measured at 1.2 nm excitation and emission slit widths (which were maintained throughout all experiments in this study), and emission was collected at 350 nm excitation. Each sample was discarded after measurement to eliminate photobleaching effects. Integrated fluorescence was calculated over 360-580 nm. These procedures were also repeated for CA-Cysteine in 0.16M sulfuric acid, except CA-Cysteine absorbance of 0.15 was used.

The $I_o/N_o$ value of CA-Cysteine using Fluoromax-4 was determined to be 584.5 based on maximum fluorescence intensity, and 1089.5 based on the integrated fluorescence based on 10 replicate samples as described. The latter value was plugged into equation (17) to predict the minimum concentration of halide that would yield an average signal to noise ratio of 3 to estimate the detection limit of the fluorescence quenching system. However, for highly acidic conditions (at 0.08M H2SO4 and above), fluorescence intensity is significantly quenched by protons, requiring a 50% higher concentration of CA-Cysteine to achieve the same $I_o$. The noise under 0.16M H2SO4 was not significantly different, with a $I_{pH}/N_o$ value of 698.6 based on maximum intensity, and 939.7 based on integrated fluorescence. This value was used to find detection limits for sulfuric acid concentrations at 0.08M and above.

B. Results and Discussion

General Fluorescence Properties of CFDs.

Figure 12:
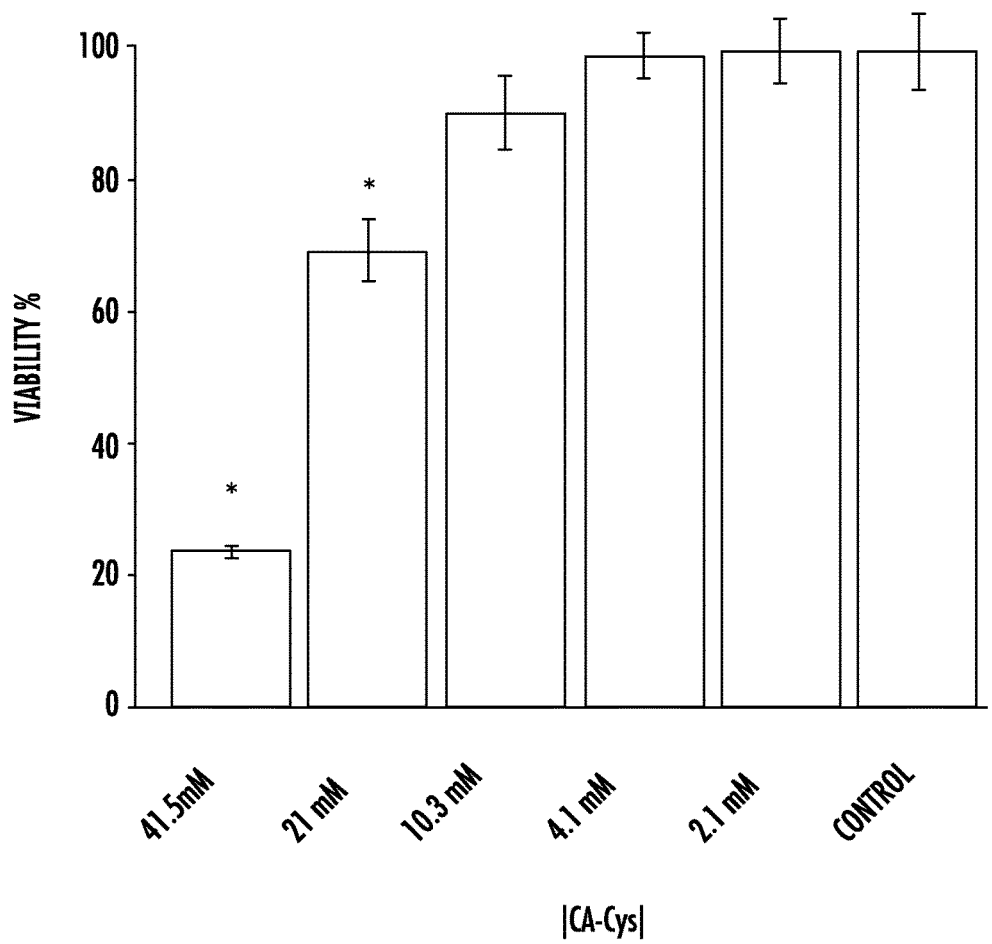
FIG. 12 illustrates a cytotoxicity chart of a material usable in methods described herein and/or consistent with compositions described herein.

The fluorescence properties of CA-Cys were investigated in depth, as summarized in Table IV, in order to study the environmental effects on CA-Cys fluorescence for the purpose of developing CA-Cys as an environment-sensitive fluorescent dye. At physiological pH, CA-Cys displays a high quantum yield of 81.20%, a long lifetime of 10.06 ns, a high Stokes shift of 67 nm, and a relatively strong molar absorptivity of 8640 $M^{-1}$ $cm^{-1}$, contributing to high fluorescence intensities. All of these factors demonstrate the potential of CA-Cys as an organic fluorescent dye in numerous fields of applications. For example, a large Stokes shift can reduce the likelihood of self-quenching when multiple fluorophores are conjugated to the same molecule. These sensing devices (such as LED devices) may also require a wide assortment of different chemical environments, to which CA-Cys has demonstrated stability in; namely, minimal quenching of CA-Cys in dioxane, acetone, ethanol, isopropanol, and DMSO compared to that in water. In fluorescence microscopy, both large Stokes shift and long lifetimes help lower background signals and reduce signals from the excitation light. Moreover, the excitation and emission maxima of CA-Cys are very close to that of DAPI, allowing compatibility with most fluorescence microscopes. With respect to bioimaging applications, CA-Cys showed in-vitro cytocompatibility with 3T3 cell line for dosages up to 10.3 mM as well as strong DAPI-channel fluorescence upon cellular uptake of CA-Cys (FIG. 12). Two carboxyl groups in CA-Cys can be used to conjugate biomolecules and functional groups, as mentioned in previous disclosure. They are also available for sensing the chemical and environmental changes in solutions.

The advantages of CFDs also demonstrated in two more aspects: long lifetimes and photostability. After excited by a pulsed laser, CFDs, including both CA-Cys and CA-Ala, exhibited longer emission decays than traditional organic dyes (Rhodamine B and Fluorescein). Calculated lifetimes of TPAs are in the range of 8-12 ns, and those of DPRs are in the range of 5-11 ns, both depending on dyes' molecule structures, emission wavelengths and solvents. For comparison, Rhodamine B and Fluorescein have lifetimes of 1.75 ns and 4.19 ns respectively, which are considerably short for fluorescence lifetime imaging (FLIM) purposes. However, CA-Cys were exceptionally stable even after 3 hours continuous excitation. CA-Cys lost less than 3% of luminescence after 3 hours. DPR-based fluorophoress, including CA-Cys and CA-Propylamine, were less stable, as they lost similar amount of fluorescence like Fluorescein. However, they still showed less photobleaching than Rhodamine B, especially in the first 10 mins. Photostability is a desired property for bioimaging applications, especially for continuous, dynamic and real-time imaging studies. Therefore, CFDs are promising to replace some existing dyes in terms of better photostability.

Additionally, CA-Cys displays complex but predictable quenching behaviors such as reversible, partial quenching with respect to its protolytic equilibria, as well as dynamic quenching due to excited state protonation at high acidity or in the presence of halide ions. These properties can be used in pH and halide sensing.

These results demonstrate CFDs are cytocompatible and cost-effective fluorescent dyes for bioimaging, chemical sensor, and biosensor applications. High quantum yields, large Stokes shifts, long lifetimes, and good photostability make CFDs particularly attractive.

TABLE IV

Summary of fluorescence Properties of CA-Cys in different forms.

Figure 13:
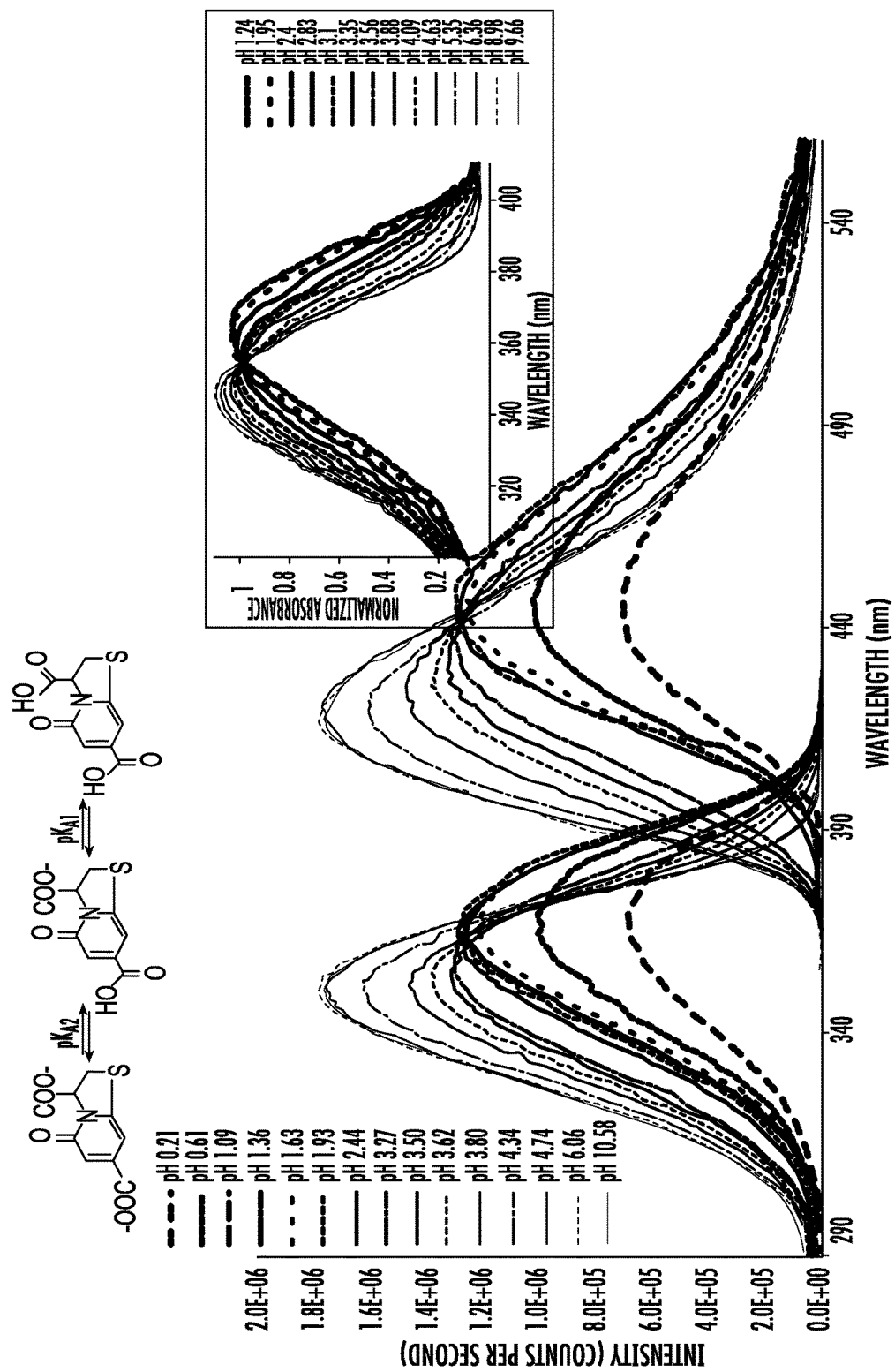
FIG. 13 illustrates emission spectra as a function of pH for materials usable in methods described herein and/or consistent with compositions described herein.

| Protolytic state | Exists at pH: | ε $M^{-1}cm^{-1}$ | Abs. Max | Exc. max | Em. max | Stokes shift | Φ | τ |
|---|---|---|---|---|---|---|---|---|
| Neutral | <2.35 | ~8300 | 362 nm | 366 nm | 445 nm | 80 nm | Quenched | Quenched |
| Anion | 2.35~3.41 | 7454 | 354 nm | 360 nm | 440 nm | 80 nm | 67.24% | 11.19 ns |
| Dianion | >3.41 | ~8640 | 346 nm | 350 nm | 418 nm | 67 nm | 81.20% | 10.06 ns | pH Dependence of CA-Cys Fluorescence. Of all solvent and environmental factors that affect fluorescence, CA-Cys appeared to display the greatest sensitivity to changes in pH. As illustrated in FIG. 13, measurement of CA-Cys fluorescence over a wide range of pH has revealed a bathochromic shift with increasing acidity. From a detailed analysis of FIG. 13, four correlations were observed. Fluorescence properties of CA-Cys were invariable from high basicity to a pH of 4.84, from which the excitation $\lambda_{max}$ began to red-shift from 350 nm, emission $\lambda_{max}$ began to red-shift from 418 nm, maximum fluorescence intensity began to decrease, and quantum yield began to decrease. As acidity was increased, all four trends continued until pH 2.44, from which the excitation $\lambda_{max}$ plateaued at 365 nm, emission plateaued at 445 nm, and fluorescence intensity and quantum yield both experienced a short local plateau. Similarly, Stokes shift increased from 67 nm to 80 nm in high acidity. Lastly, absorbance $\lambda_{max}$ shifted similarly to that of the maximum excitation, while absorbance intensities remained relatively constant. Such observations were visually confirmed under UV light, where CA-Cys in acidic solution displayed a marked quenching, while in basic solution there is an emission color shift to violet. All of these patterns were reminiscent of a pH-dependent equilibrium, thus the predominant mechanism of intensity quenching and bathochromic shifts was hypothesized to be attributed to changes in protolytic equilibria. The noticeably linear quenching of intensities past pH 1.63 is discussed with respect to lifetime analysis herein below.

To support this hypothesis, the above mentioned patterns in fluorescence were attributed to various protolytic states of CA-Cys based on pH-dependent shifts in protolytic equilibria. As a first step, acid-base titration of CA-Cys revealed the presence of two carboxyl groups with close pKa values. A $pKa_1$ value of 2.345 was assigned to the 3-carboxyl group, while a $pKa_2$ value of 3.41 was assigned to the 7-carboxyl group based on the reasoning that the 3-carboxyl is derived from and structurally similar to the α-carboxyl group of cysteine, while the 7-carboxyl is in a resonance-stabilized environment similar to that of benzoic acid. Because this 7-carboxyl pKa value of 3.41 matched the isobestic absorption point at pH 3.35 and emission transition at pH 3.27, the blue-shifted and highly fluorescent species was attributed to CA-Cys in its dianion state which, upon single protonation about its pKa, experienced a marked bathochromic shift and quenching of intensity attributed to the anion state of CA-Cys. On the other hand, the transition from the anion state to the neutral state at pH 2.35 seemed to have minor effects on the fluorescence spectra.

Figure 14:
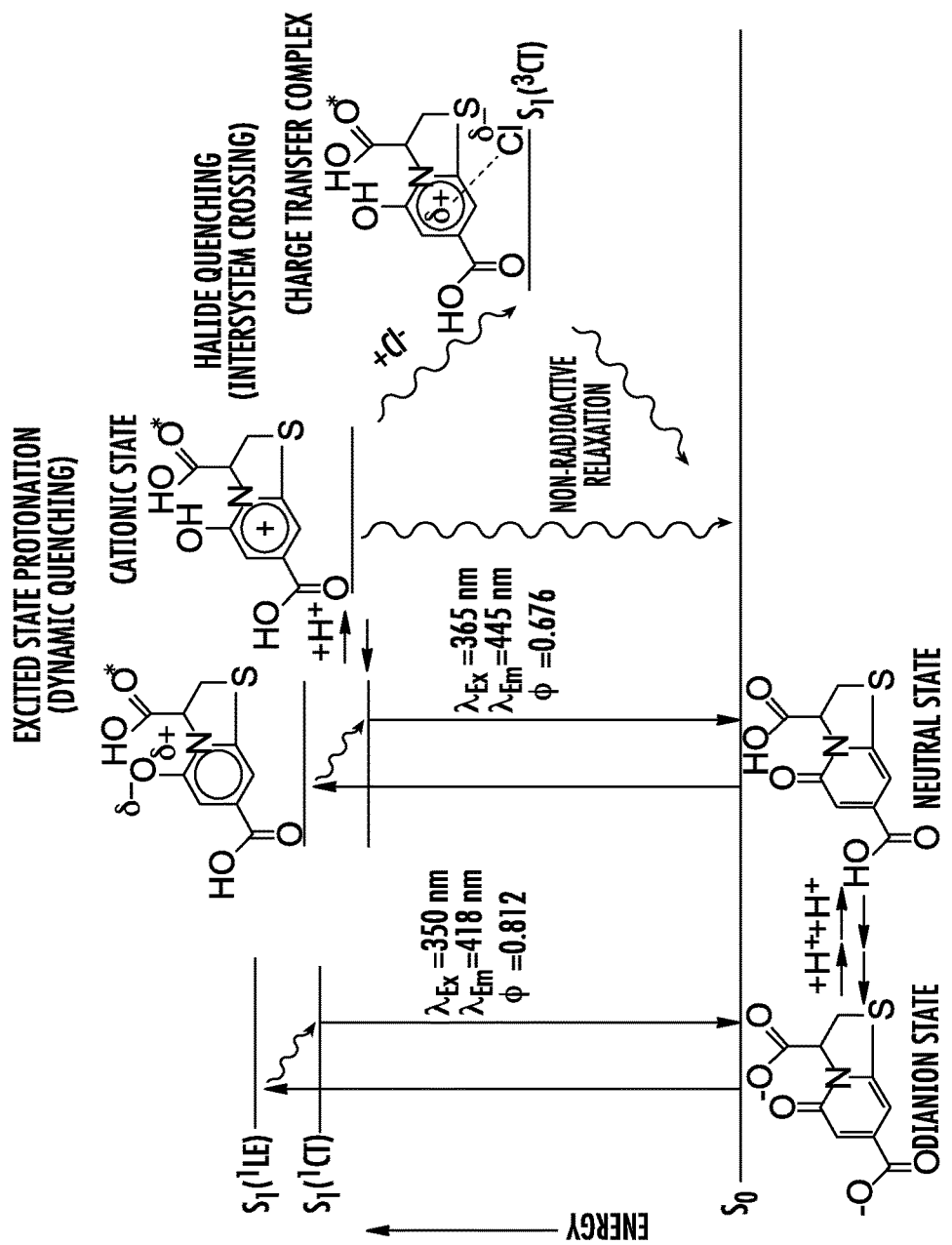
FIG. 14 illustrates a Jablonski diagram of quenching mechanisms for a material usable in methods described herein and/or consistent with compositions described herein.

Next, a theoretical, ground-state protolytic equilibria of CA-Cys at various pH was plotted. The dianion state was color coded for a qualitative comparison between the protolytic equilibria of with the fluorescence transitions summarized in Table IV. The transitory appearance of the anion state between pH 2.5 and 3.5 seemed to match well with the pH transition range of the fluorescence spectra. These results describe one aspect of the complete Jablonski diagram schematics of CA-Cys quenching mechanisms shown in FIG. 14, in which the disappearance of the dianion with respect to its protolytic equilibrium is responsible for the spectral shifts and fluorescence quenching. Both phenomena are explained through the effects of ionization on the conjugated 2-pyridone ring electron distribution.

Applications in pH Sensing.

Figure 15:
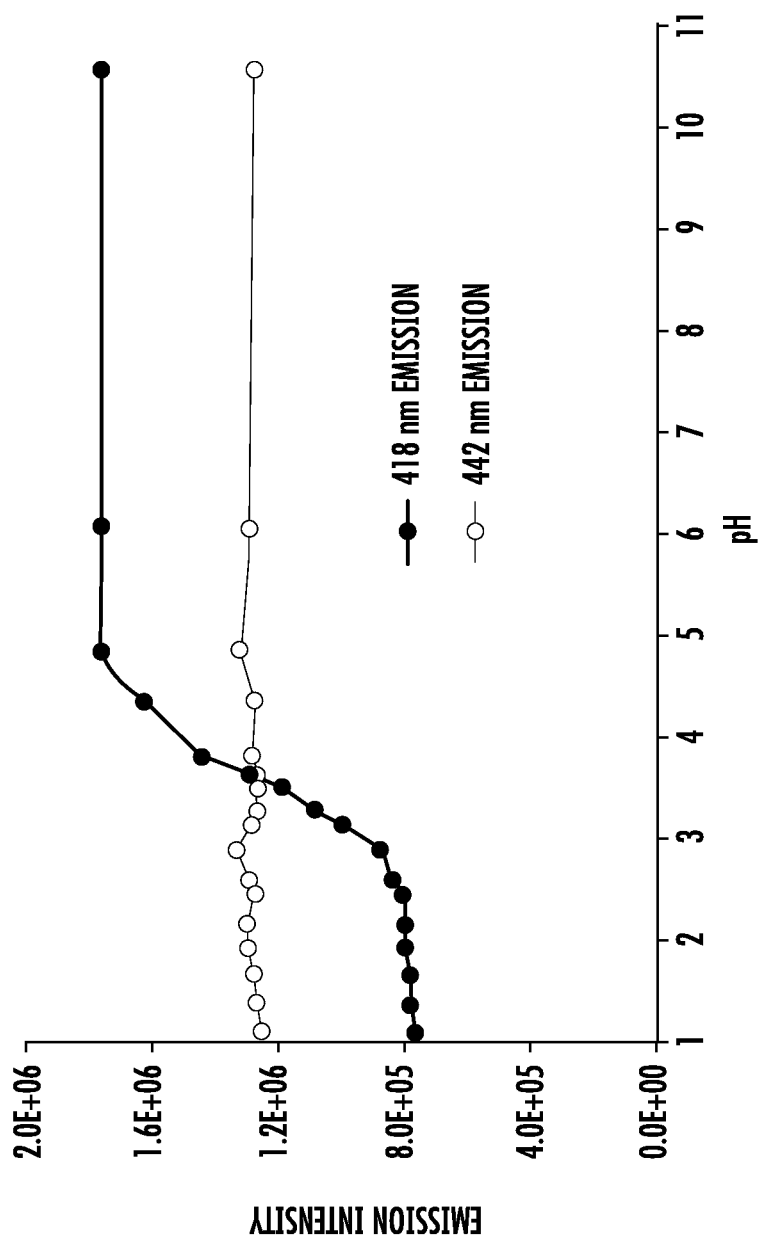
FIG. 15 illustrates emission intensity plots at differing pH values for a material usable in methods described herein and/or consistent with compositions described herein.

The high predictability and significant quenching of CA-Cys fluorescence spectra with respect to its protolytic equilibria demonstrate its viability as an organic pH sensor for applications in low pH biological environments such as in gastric juice. As shown in FIG. 13, CA-Cys experiences a 1.37-fold quenching of overall fluorescence upon protonation of its first carboxyl group. However, as FIG. 15 indicates, emission intensities collected at a fixed 418 nm show roughly 2.25-fold quenching from a long region of constant intensity at pH 4.5-11 to a lower, stable region of constant intensity at pH 1-3. There is a predictable, linear increase in intensity from pH 3 to 4.5. Furthermore, emission collected at a fixed 445 nm is shown in FIG. 15 to be an isobestic point where intensities are independent of pH (up to pH 1), which should greatly improve the functionality of CA-Cys as a pH sensor. In other words, utilizing 445 nm as a dual-wavelength reference point allows for background subtraction and normalization with respect to absorbance or concentration. Ratios of 418 nm and 445 nm fluorescence intensities, $I_{418\ nm}/I_{445\ nm}$, were tracked across increasing pH, resulting in a ratio of 0.7 in the acidic range and a ratio of 1.6 in the basic range, demonstrating that CA-Cys can be used as a fluorescent pH sensor that switches "off" in acidic environments. Furthermore, $I_{418\ nm}/I_{445\ nm}$ increases linearly in the region of pH 3 to 4.5 for accurate determination of pH within this region, plotted and fitted with an $R^2$ value of 0.982. To sum up, $I_{418\ nm}/I_{445\ nm}$ values near 1.6 indicate pH above 4.5, values below 0.7 indicate highly acidic environments below pH 3, while any intermediate $I_{418\ nm}/I_{445\ nm}$ values can determine the exact pH with good accuracy. It is important to note that CA-Cys fluorescence is in accordance with Kasha's rule, i.e. fluorescence occurs from the lowest excited state, $S_1 \rightarrow S_0$, thus the emission $\lambda_{max}$ is independent of the excitation wavelength, and a fluorescence excitation scan at a fixed emission of 418 nm or 445 nm would provide the maximum fluorescence intensity for that emission wavelength. Also of importance is the reliable range of the isobestic point, which is broken at high acidities (noticeably below pH 1) due to dynamic quenching effects.

Interestingly, both bathochromic shift and quenching behaviors are tunable with conjugation or modification of DPR or TPA structures. Following the protocol from section 2.3, CA-Cys conjugated to PEG resulted in water-soluble biodegradable photoluminescent polymers (WBPLPs) that displayed a shift in the pH of maximal fluorescence from basic (pH 4.8~11) to acidic (pH 2.5), while the bathochromic shift was delayed until pH 9, indicating a change in pKa values upon conjugation Furthermore, CA-Alanine enabled a sharp colorimetric transition at pH 9.75. PH insensitive CFDs can be synthesized by removing pH-sensitive carboxyl groups, as in the case of CA-propylamine or after performing carbodiimide crosslink chemistry of carboxyl groups. Thus, conjugation to polymers or nanoparticles or modification of functional groups can increase the versatility of CA-Cys as a pH sensor.

Lifetime Analysis of Static and Dynamic Quenching.

Lifetime studies were conducted in order to discern the exact mechanism of quenching governing the protolytic transition as well as the distinguishable further quenching under highly acidic conditions (FIG. 13). TCSPC methods are superior to standard fluorometry for this purpose because lifetime decays are unaffected by changes in concentration and changes in sample absorbance in different solvents. Moreover, as explained in section 2.7, lifetimes are not affected by ground state complex formations, so static quenching is noticeably distinguishable from collisional dynamic quenching through the application of Stern-Volmer plots, where the former displays $K_{SV}$ values of 0 (constant lifetimes) while the latter displays $K_{SV}$ values that increase with the bimolecular quenching rate of the quencher. Quenching rate constants greater than $10^{10}$ $M^{-1}s^{-1}$ typically represent diffusion-limited collisional interactions.

Figure 16:
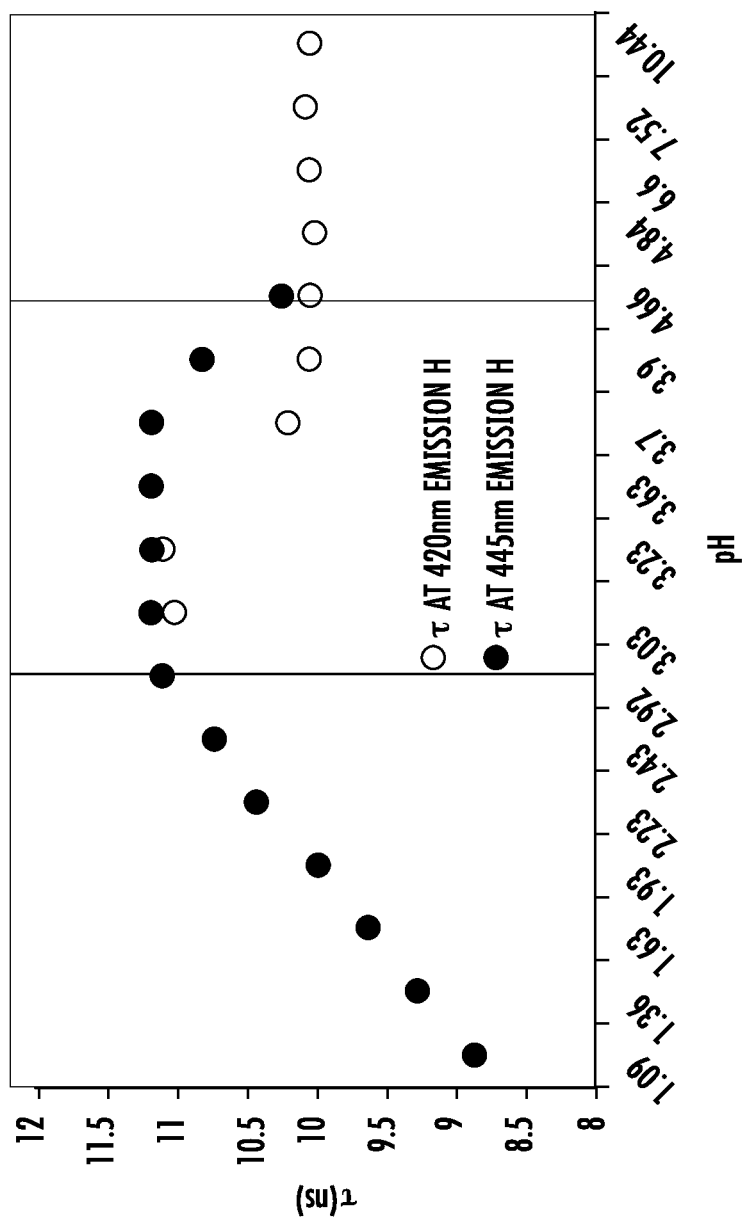
FIG. 16 illustrates a plot of fluorescence lifetime values for a material usable in methods described herein and/or consistent with compositions described herein at differing pH values.
Figure 17A:
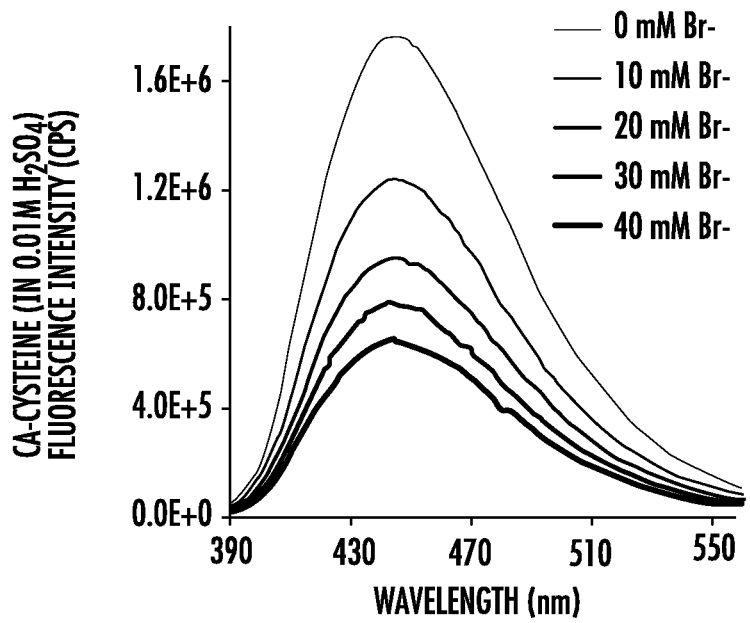
FIGS. 17A-B illustrate data plots of fluorescence for a material usable in methods described herein and/or consistent with compositions described herein when disposed in different salts.
Figure 17B:
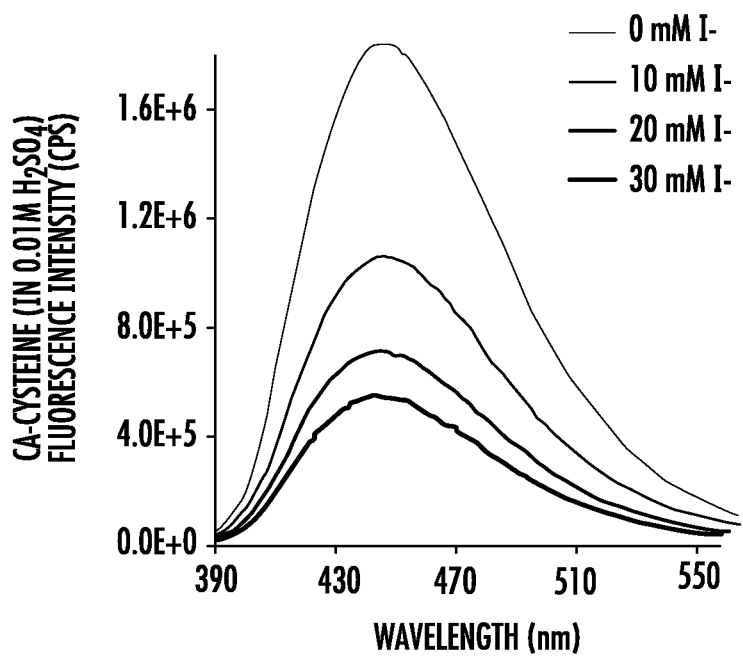

For lifetime measurements of CA-Cys above pH 3.7, lifetimes were collected at 420 nm emission wavelength, while lifetimes of CA-Cys below pH 3.7 were collected at 445 nm to allow for maximum fluorescence intensities of the respective protolytic species. This only enhanced the precision and residuals of the lifetimes, as the emission wavelength had little effect on actual lifetime values. As FIG. 16 shows, lifetime values were constant at 10.06 ns at pH ranges where the dianion is expected to dominate the equilibria, but this value abruptly disappears at pH 3.23. Likewise, the lifetime is constant at 11.19 ns where the anion state is expected to dominate, first appearing around pH 3.70 and stabilizing until pH 2.92. In accordance with the laws of static quenching, lifetimes are independent of pH for the dianion species until most have converted into the anion state, at which the dianion lifetime of 10.06 disappears along with a drastic reduction of fluorescence intensity at 418 nm. However, what is instrumentally observed is only partial quenching, since the absence of the dianion species is instantly replaced by the presence of the anion and neutral species with a decreased but significant intensity at 445 nm and a lifetime of 11.19 ns. Therefore, the quenching mechanism with respect to the protolytic transition is a form of partial, static quenching due to the formation of a ground state protonated complex with unique fluorescence properties.

However, FIG. 16 reveals two exceptions to this static quenching behavior. First, along a narrow range of pH 3.7 to 3.9 exist single-exponential lifetimes that are significantly affected by the emission wavelength at which data are collected, as measurements at 420 nm emission gave lifetimes close to the dianion lifetime, while data collected from 445 nm emission gave lifetimes closer to the anion lifetime. These lifetimes deviate slightly from the expected 10.06 and 11.19 ns for the dianion and anion species respectively. Not intending to be bound by theory, such phenomena are explained with the observation that single-exponential fitting produces very high $\chi^2$ values only during this protolytic transition range, indicating that the reported lifetimes are actually averages of the contributions of multiple lifetime values. Hence even at 445 nm, the lifetime decay function is affected by the dianion species due to its broad emission spectrum, and vice versa at 420 nm.

A second exception to the pH-dependent static quenching of CA-Cys in FIG. 16 is the negative deviation of lifetime values from pH 2.43 and below, which are accompanied by very low $\chi^2$ values for 1-exponential decay, dismissing the speculation that another ground state protolytic form is contributing to this quenching behavior. As a matter of fact, the noticeable linearity of the quenched lifetime values is a textbook example of dynamic (excited state) quenching. While fluorescence quenching of CA-Cys is dominated by protolytic equilibria effects under basic to moderately acidic environments, proton-induced dynamic quenching becomes dominant under high acidity. Not intending to be bound by theory, the molecular mechanism behind proton-induced quenching, is postulated to be from excited-state protonation of the 5-carbonyl group as the preferred site of protonation due to a resonance-stabilized enol structure. This protonated complex is expected to undergo nonradiative decay (following a linear SV-relation) and only formed at high acidities after both carboxyl groups have been protonated.

These proton-dependent behaviors are better displayed through a Stern-Volmer plot of quenching versus proton concentration, where quenching is quantified by the term $I_o/I$, which as mentioned herein, is equivalent to $\tau_o/\tau$ or $\Phi_o/\Phi$ depending on the instrument of detection, where $I_o$ is defined as the fluorescence intensity in the absence of quenchers, while I is the fluorescence intensity in the presence of quenchers. As CA-Cysteine undergoes 99% conversion from the dianion state, static quenching comes to a plateau that is marked by stabilized fluorescence intensities from pH 2.2 to 1.6 (FIG. 13). Dynamic quenching effects from the excited state pKa of the 5-carbonyl are not noticeable until pH 2.2 and below, where the Stern-Volmer plot shows linearity, indicating that proton quenching transitions from static quenching (based on 7-carboxyl pKa) to dynamic quenching (postulated to be based on the excited state deprotonation of carbonyl) at this pH.

Halide-Assisted Fluorescence Quenching and Halide Sensing/Quantification.

The environment sensitivity of CA-Cysteine is not exclusive to proton quenching. When three different strong acids—sulfuric acid, nitric acid, hydrochloric acid—were used to quenching CA-Cysteine at varying concentrations, hydrochloric acid had a surprisingly greater degree of quenching than the other acids. As all are strong acids with 99% dissociation of the first proton, nitric acid and hydrochloric acid are expected to donate equivalent numbers of protons at constant concentrations, while sulfuric acid should donate slightly greater numbers. CA-Cysteine is a chloride sensor under very specific conditions, i.e. under high acidities. Indeed, magnesium chloride only quenched the fluorescence of CA-Cysteine in strongly acidic conditions (pH 2.4) from fluorescence intensity and lifetime studies, while there was no significant quenching at pH 8.2. Magnesium sulfate and sodium sulfate did not quench fluorescence under any conditions, and sodium hydroxide did not quench fluorescence at varying concentrations. It was demonstrated that CA-Cysteine is also quenched by bromide and iodide at even greater affinities. Other salts containing citrate, phosphate, and other salts did not quenching CA-Cysteine under any condition.

To translate halide quenching into quantitative sensing applications, a modified Stern-Volmer equation (Equation 14) was used to linearize the effects of two quenchers, protons and the halide being studied, on the fluorescence of CA-Cysteine. Equation 14 is reproduced below with the specific quenchers shown:

$$\frac{I_o}{I_{H,Cl}} = K_{SV(H+)}[H^+] + K_{SV(Cl-)}[Cl^-] + 1 \qquad \text{Equation 23}$$

Figure 18A:
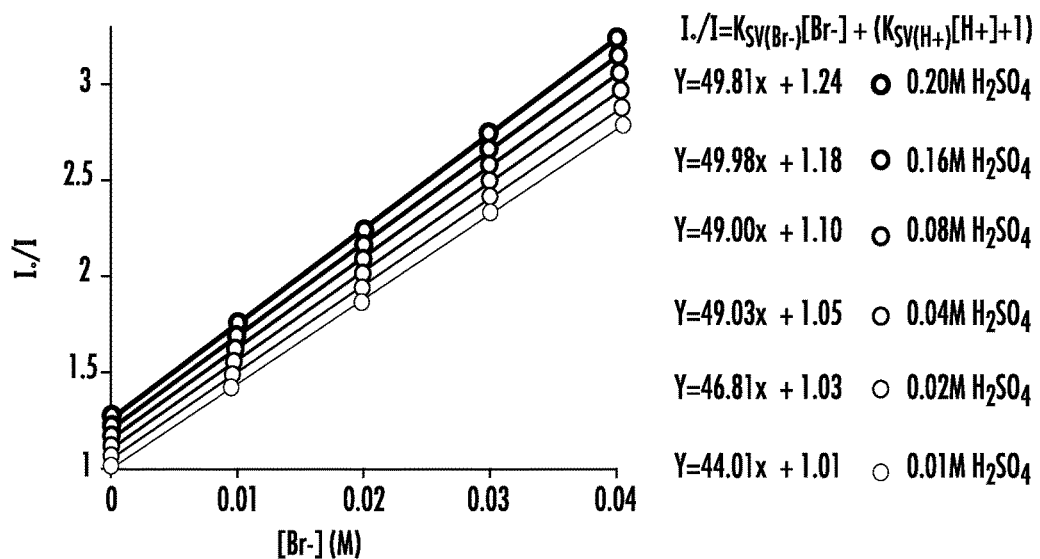
FIGS. 18A-B illustrate data plots of halide sensitivity for a material usable in methods described herein and/or consistent with compositions described herein.
Figure 18B:
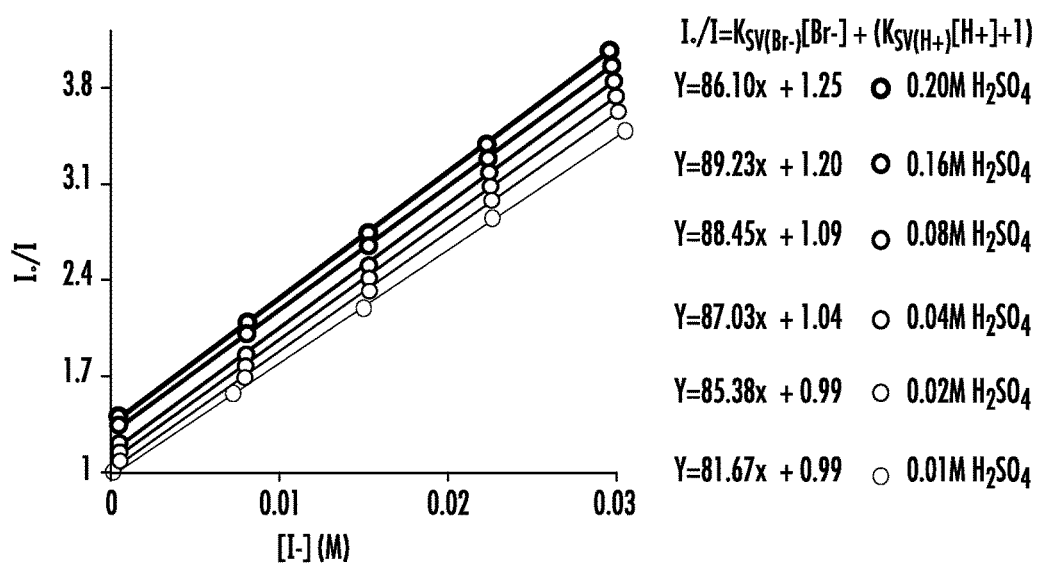
Figure 21:
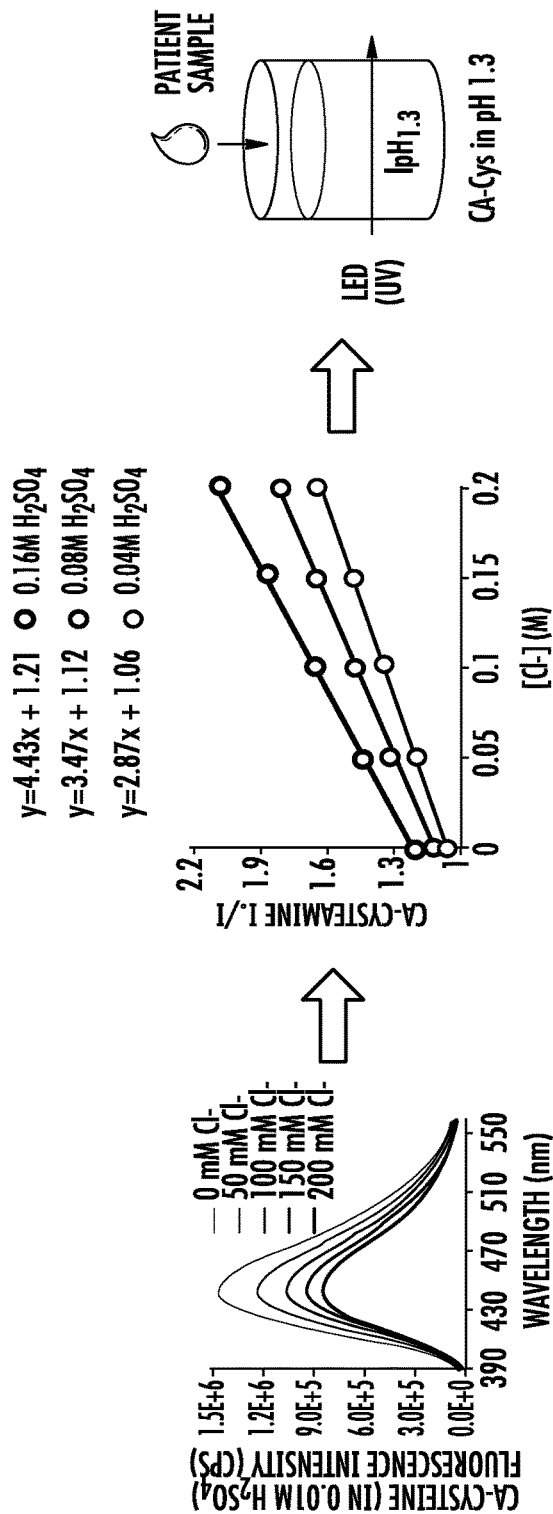
FIG. 21 illustrates data plots of chloride sensitivity for a material usable in methods described herein and/or consistent with methods described herein.

Since the measured sample fluorescence is quenched by both protons and halides, the unquenched fluorescence, $I_o$, was defined as the fluorescence of the neutral state CA-Cysteine in the absence of additional proton or halide quenchers. As mentioned above, the effects of protolytic equilibria stabilize around pH 2.2, where CA-Cysteine undergoes 99% conversion from the dianion state and is marked by constant fluorescence intensities (FIG. 13). This pH is also the transition point where dynamic quenching effects begin to materialize, where the Stern Volmer plot begins to show linearity. Thus we chose the fluorescence intensity at pH 2.2 (in the absence of halides) as the unquenched reference signal, $I_o$. $I_{H,Cl}$ in equation 23 is the sample fluorescence at the pH and halide concentration indicated. With this method, halide sensitivity or Ksv for each halide was catalogued at constant sulfuric acid concentrations (FIGS. 18A, 18B, and 21). The slope in FIGS. 18A, 18B, and 21 represent Ksv of the specific halide at specific sulfuric acid concentrations, as the y-intercept absorbs the constant proton quenching term, $K_{SV(H+)}[H^-]$. This method allowed direct comparison of chloride $K_{SV}$ values at various pH under the same y-intercept. Under all conditions, halide quenching showed strong linearity, identifying collisional, dynamic quenching as the quenching mechanism. Furthermore, the degree of quenching intensified with increasing acidity, and with heavier halides.

The mechanism of chloride sensing may be due to geometric electrostatic effects of ion-pair complex formation. Not intending to be bound by theory, it is believed that halides quench CA-Cysteine through the "heavy atom effect", in which partial charge transfer during ionic interactions with heavy atoms generate spin-orbit coupling leading to intersystem crossing to the triplet state. The reaction and kinetics of a chloride charge transfer complex is described in equation 24:

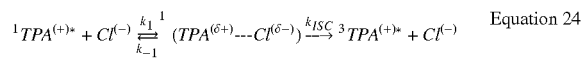

Equation 24 where $k_{ISC}$ is the rate constant of intersystem crossing. The quenching constant, $k_q$, for CA-Cys can then be described according to the following equation:

$$K_{SV} = k_q \tau = \frac{k_1 k_{ISC}}{k_{-1} + k_{ISC}} \tau \qquad \text{Equation 25}$$

The efficiency of quenching has been experimentally observed to increase with the increasing mass of the halide, i.e. Cl—<Br—<I—. Birks et al. explain that the quenching constant can be a function of the ionization potential, I, of the quencher such that:

$$\log \frac{k_1}{k_{-1}} \propto -I \qquad \text{Equation 26}$$

where $k_1/k_{-1}$ is a measure of the strength of ionic interaction of the quencher. Thus heavier halides such as bromide and iodide have an even stronger effect on the quenching of CA-Cys fluorescence, as observed in FIGS. 18A-B. Halides amongst themselves are known to be independent quenchers.

This mechanism may also explain the pH-dependence of halide quenching of CA-Cysteine. Due to the proximal arrangement of the electron-withdrawing carbonyl and electron-donating heterocyclic nitrogen, charge separation occurs in the excited state, hindering ionic attraction of halides to the positively charged nitrogen and electron-deficient aromatic ring. Under highly acidic conditions, this negatively charged enolate becomes protonated, leading to increased rates of intersystem crossing, whereas under physiological conditions this non-radiative pathway is normally suppressed. This pH-dependence is in stark contrast with commercial halide sensors, MEQ, SPQ, and MQAE that are quenched by halides independent of pH. These quinone-based dyes operate under the same mechanism of a strong ICT state forming a charge-transfer complex with a heavy atom, yet the protonation step is unnecessary because the EWG and EDG groups are spatially separated so that the positive charge is localized on the donor far from the acceptor. The ability of CA-Cys to switch halide quenching rates on and off reversibly with respect to pH may prove advantageous in some applications such as simultaneous sensing of multiple halides.

Herein, we exploit the concepts of the ICT state and placement of EWG and EDGs to expand the applications of CFDs. For example, the emission of CA-Cys can be further red-shifted with additional EWGs about the conjugated ring, while its pKa can be improved closer to physiological pH by removing 3-COOH by polymer conjugation. Removal of the 5-keto group can also avoid the need for the cationic state of CA-Cys, allowing for pH-independent halide sensing.

Figure 19:
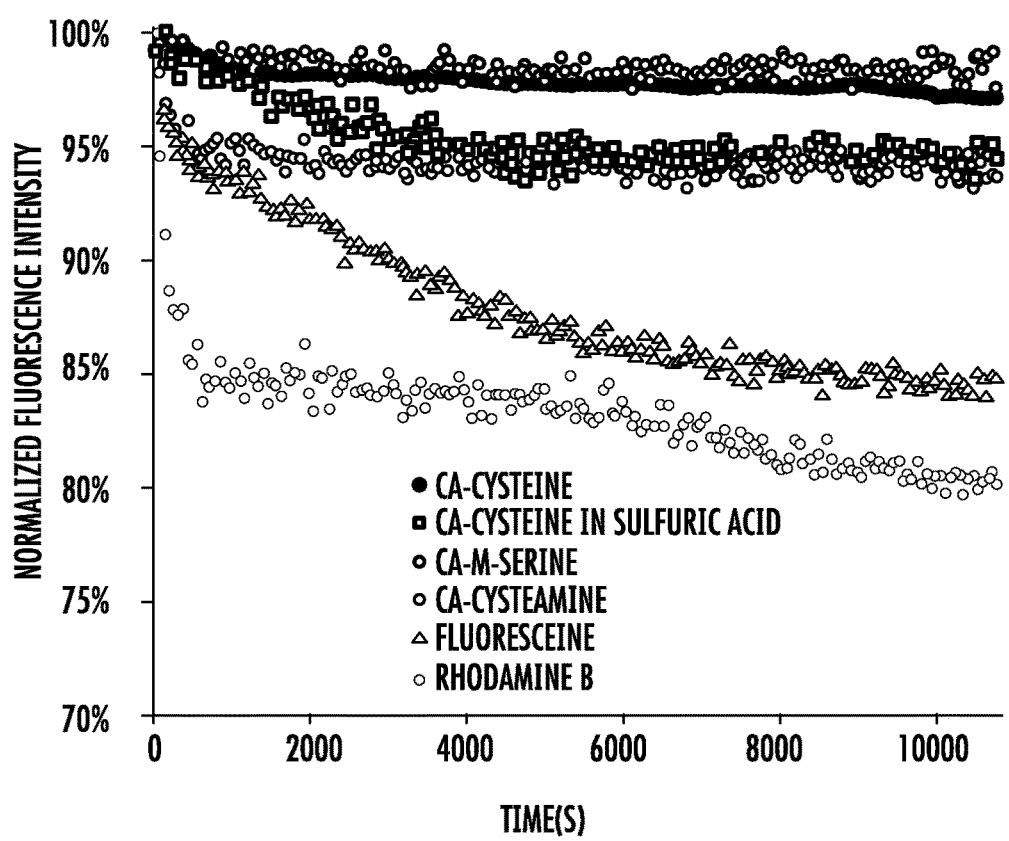
FIG. 19 illustrates photostability data for various materials usable in methods described herein and/or consistent with compositions described herein.
Figure 20A:
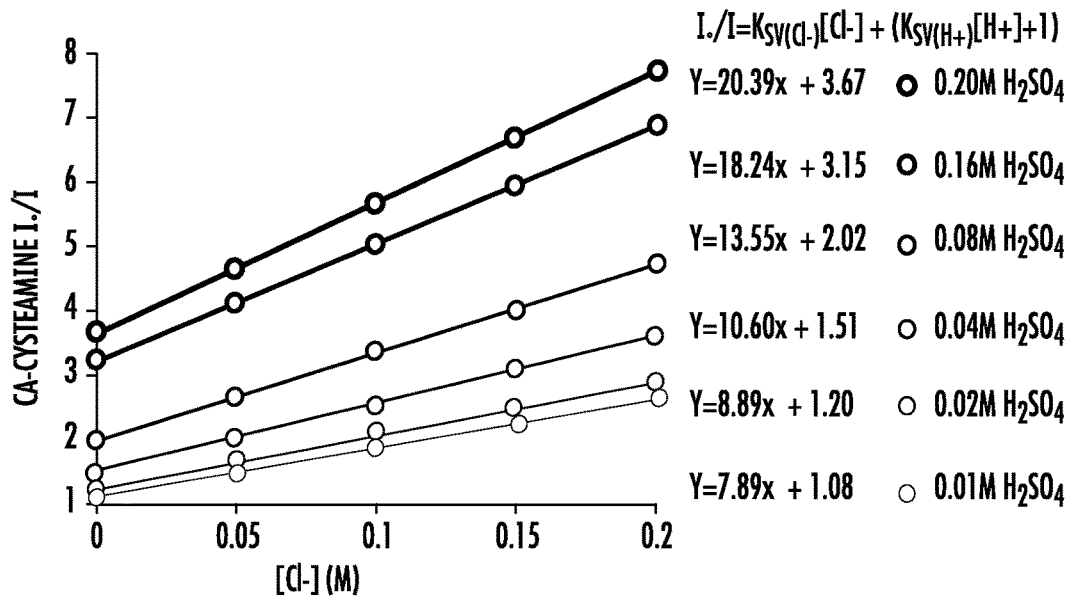
FIGS. 20A-B illustrate data plots of chloride sensitivity for a material usable in methods described herein and/or consistent with methods described herein.
Figure 20B:
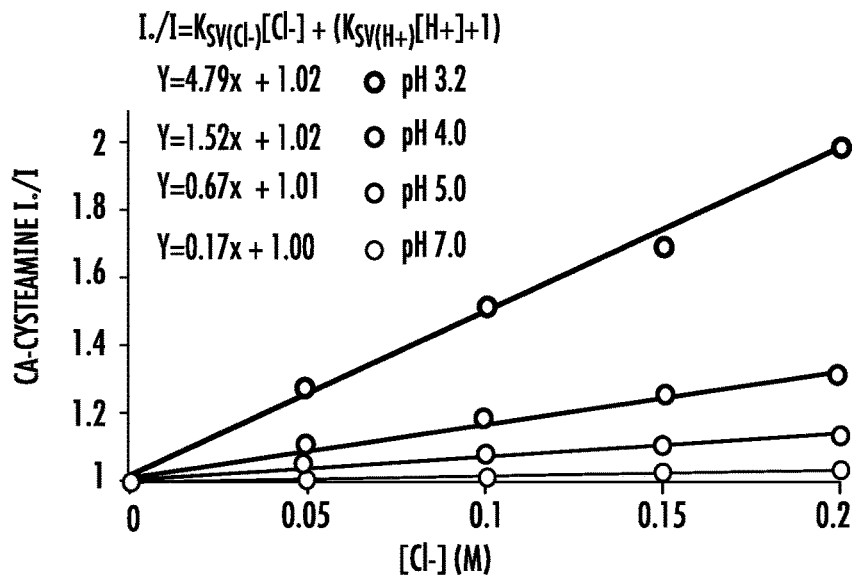

To demonstrate this, citric acid was reacted with Cysteamine or Methyl-Serine to create TPA structures without the 7-carboxyl, or with an additional 7 methyl group respectively. Along with CA-Cysteine, these three compounds constitute a unique sub-class within CFDs that demonstrate halide sensitivity to varying degrees at varying pH conditions. All compounds demonstrate strong photostability (FIG. 19). Removal of the 3-carboxyl, as in CA-Cysteamine, seems to increase sensitivity of all halides across all pH, likely because steric or charged interaction of this carboxyl group is removed, allowing increased halide accessibility to form ionic interactions. Halide sensitivity increases dramatically just past the pKa of CA-Cysteamine, supporting the mechanism that both charged hindrance from either carboxyl groups effectively lower halide sensitivity (FIGS.

20A-B). CA-Methyl-Serine shows very low chloride sensitivity even under highly acidic conditions, possibly due to the 7-methyl group increasing steric hindrance.

Detection Methods, Applications, and Limits of Detection.

For determination of single halides in solution, one measurement of the solution sample, diluted in CA-Cysteine and sulfuric acid, is necessary following a standard curve that is linearized by the Stern-Volmer equation (FIG. 21). In most physiological samples such as cell media, blood, sweat, and urine, the concentrations of bromide and iodide are low enough that their respective contributions to the determined $K_{SV}$ are deemed negligible. However, in samples where bromides and iodides do contribute significantly to fluorescence quenching, a system of equations for the determination of multiple quencher concentrations based on a system using multiple fluorophores must be used.

Simultaneous Sensing of Multiple Halides—Protocol.

Simultaneous sensing is performed by first establishing a standard curve for each halide at three different pH values to determine all nine Ksv values in equation set 27, and this procedure needs to be performed only once. Next, the quenched fluorescence of replicate samples are measured at three different pH values to determine three different Io/I shown in equation set 27. Once all values are plugged in, equation set 27 is now left with three unknowns (chloride, bromide, and iodide concentrations) and three equations, which can be determined with a matrix solver.

$$\frac{I_O}{I_{pH1.8}} = K_{SV(Cl-)}[Cl-] + K_{SV(Br-)}[Br-] + K_{SV(I-)}[I-] + (K_{SV(H+)}[H+] + 1)$$

$$\frac{I_O}{I_{pH1.3}} = K_{SV(Cl-)}[Cl-] + K_{SV(Br-)}[Br-] + K_{SV(I-)}[I-] + (K_{SV(H+)}[H+] + 1)$$

$$\frac{I_O}{I_{pH0.8}} = K_{SV(Cl-)}[Cl-] + K_{SV(Br-)}[Br-] + K_{SV(I-)}[I-] + (K_{SV(H+)}[H+] + 1)$$

Equation set 27

For a simplified demonstration of simultaneous sensing of multiple halides, simulated sea water diluted 1:3 containing final concentrations of 187.3 mM chloride and 0.2895 mM bromide (a ratio of 609.53:1) was prepared and the above protocols were modified for the detection of two halides at two pH conditions. In many applications, the concentration of one chloride is often known or assumed if there is very little variation. If this is the case, only one measurement (at a single pH) is necessary. This is demonstrated in Table V, where trace bromide is determined in the presence of known or assumed chloride solutions.

TABLE V

| Results | |
| --- | --- |
| Simulated Sea Water | 0.01M $H_2SO_4$ |
| Expected $K_{Cl-}$ | 2.0242 |
| Expected $K_{Br-}$ | 44.08/676 = 0.068 |
| Expected $K_{total}$ | 2.0922 |
| Experimental $K_{total}$ | 2.0964 |
| Input parameters: 1.94% Cl, 0.0067% Br (Molar ratio of 647:1 Cl- to Br-) | |
| Calculated molar ratio | 609.53:1 |

TABLE V-continued

| Results | |
| --- | --- |
| Input [Cl-] | 187.3 mM |
| Input [Br-] | 0.2895 mM |
| Given fixed molar ratio for Sea Water | |
| Calculated [Cl-] | 186.6 mM |
| Calculated [Br-] | 0.288 mM |

Following a standard curve of chloride and bromide (giving Ksv values of 2.024 and 44.08 respectively), the unknown (sea water) sample was measured at 1/12, 2/12, 3/12, and 4/12 dilutions. The resulting slope, or Ksv of the combined chloride and bromide sample, allows determination of the molar ratio of chloride to bromide, as well as the concentration of bromide if chloride is already known (Table V). The ability to measure trace bromide in the presence of bulk chloride interference is a significant advantage over traditional halide detection methods because a separation step (chemical or chromatographic) is often required, which deters automation and requires high maintenance equipment or manual labor. On the other hand, methods lacking this separation step suffer from halide interference because the reactivity of bromide is intermediate to that of chloride and bromide in terms of chemical reactivity (colorimetric, mercuric nitrate), oxidizing potential, and conductivity (ion-selective electrode). Thus the above method provides an automated method for determination of trace halides in the presence of other significant interfering halides. When the unknown (sea water) sample is measured at two different pH conditions (0.01M $H_2SO_4$ and 0.16M $H_2SO_4$), the exact concentration of bromide and chloride can be determined without any assumptions by solving equation set 28 below:

$$\frac{I_O}{I_{pH1.8}} = K_{SV(Cl-)}[Cl-] + K_{SV(Br-)}[Br-] + K_{SV(H+)}[H+] + 1$$

$$\frac{I_O}{I_{pH3.8}} = K_{SV(Cl-)}[Cl-] + K_{SV(Br-)}[Br-] + K_{SV(H+)}[H+] + 1$$

Equation set 28

Figure 22:
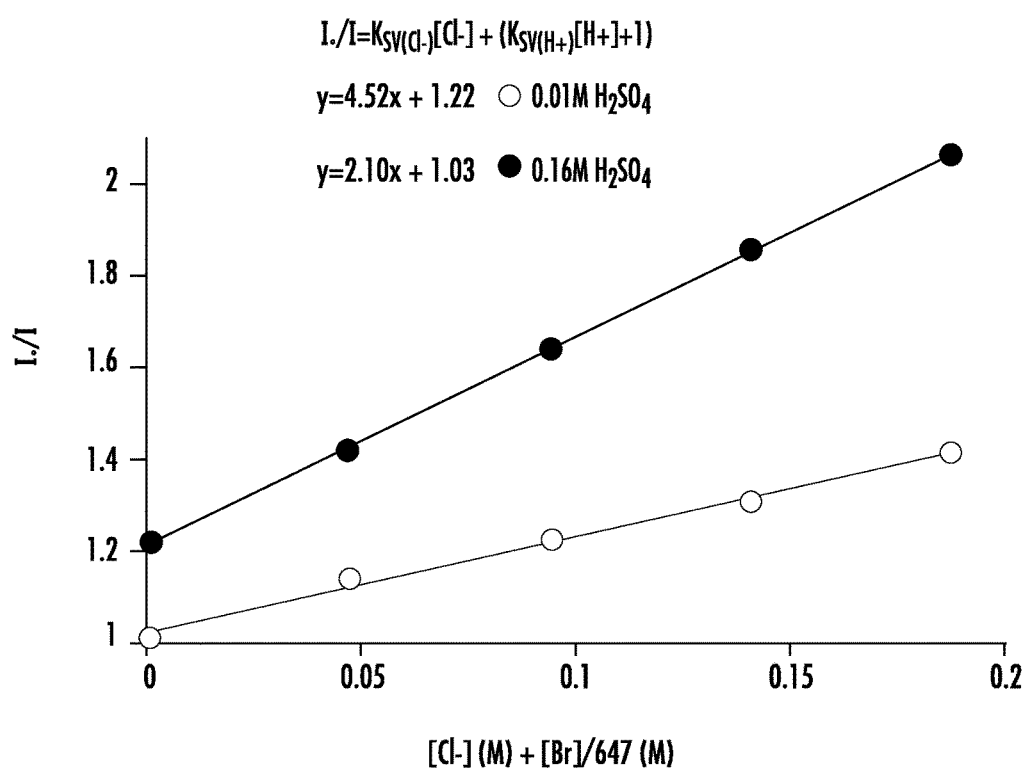
FIG. 22 illustrates a data plot of concentration of halide salts obtained by one or more steps of methods described herein.

From the results shown in FIG. 22, the calculated chloride and bromide concentrations were 187.1 mM and 0.269 mM respectively, close to the input values simulating sea water. If bromide interference is not taken into account, sea water at a Cl:Br ratio of 647:1 would result chloride measurements of 193.9 mM at 0.01M H2SO4 and [Cl—]=191.1 mM at 0.16M $H_2SO_4$, corresponding to positive errors of 3.55% and 2.05% respectively.

Chlorine Sensing.

CA-Cysteine is also sensitive to chlorine. Not intending to be bound by theory, studies revealed that chlorine sensing is the result of chemical titration, possibly from an aromatic chlorination reaction of CA-Cysteine that produces a non-fluorescent compound. There is a change in ground state absorbance of CA-Cysteine in chlorinated solutions, fluorescence quenching does not reverse when chlorine is gassed out of solution, and quenching seems to be static, not dynamic, marked by a distinct titration point below which added CA-Cysteine does not increase fluorescence of the solution due to the presence of chlorine. This chlorine detection method seems to be much more sensitive than for halide detection, as chlorine in tap water diluted 1:2 can be measured. Furthermore, because measurement is based on the titration point, the presence of halides in solution would only lower the slope of the fluorescence plots without affecting the titration point. In reverse order of what observed results for halide quenching, sensing of bromine is much less sensitive than chlorine. Visual confirmation of the titration point is possible with a UV lamp, allowing for a low-cost and low-tech method of chlorine determination. It should also be noted that by varying the use of amine-containing molecules used in the syntheses of fluorophores described herein, it was possible to tune the chloride sensing at neutral pH. For example, BPLP-Allylamine has been synthesized and used to sense chloride at neutral pH.

Various embodiments of the present invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A method of sensing an analyte comprising:
disposing a fluorophore in a chemical or biological environment, the fluorophore comprising a luminescent reaction product of (i) a polycarboxylic acid of and (ii) a chemical species comprising a primary amine moiety;
exposing the chemical or biological environment to electromagnetic radiation having a wavelength corresponding to an excitation wavelength of the fluorophore;
detecting light emitted by the fluorophore; and
correlating the light emitted by the fluorophore to a presence or absence and/or a concentration of an analyte within the chemical or biological environment in an amount above a minimum detection threshold, the analyte comprising hydrogen ions, halide ions, halogens, an organic solvent, and/or a polar solvent.

2. The method of claim 1, wherein the presence of the analyte:
reduces an intensity of light emitted by the fluorophore compared to the absence of the analyte;
increases an intensity of light emitted by the fluorophore compared to the absence of the analyte;
alters a photoluminescence quantum yield of the fluorophore compared to the absence of the analyte;
alters a fluorescence lifetime of the fluorophore compared to the absence of the analyte; or
shifts a peak emission wavelength and/or a peak excitation wavelength of the fluorophore compared to the absence of the analyte.

3. The method of claim 1, wherein the analyte comprises hydrogen ions and the method comprises a method of sensing pH within the chemical or biological environment.

4. The method of claim 3, wherein the fluorophore senses pH within a range of 0 to 11 with an accuracy within ±0.5 pH units.

5. The method of claim 3, wherein:
the fluorophore has a first excitation maximum wavelength at a first pH within the chemical or biological environment and a second excitation maximum wavelength at a second pH within the chemical or biological environment, wherein the first pH and the second pH differ by 1 or less, and wherein the first excitation maximum wavelength and the second excitation maximum wavelength differ by at least 5 nm;
the fluorophore has a first peak emission wavelength at a first pH within the chemical or biological environment and a second peak emission wavelength at a second pH within the chemical or biological environment, wherein the first pH and the second pH differ by 1 or less, and wherein the first peak emission wavelength and the second peak emission wavelength differ by at least 5 nm;
the fluorophore has a first peak emission intensity at a first pH within the chemical or biological environment and a second peak emission intensity at a second pH within the chemical or biological environment, wherein the first pH and the second pH differ by 0.5 or less, and wherein the first peak emission intensity and the second peak emission intensity differ by at least 15%;
the fluorophore has a first photoluminescence quantum yield at a first pH within the chemical or biological environment and a second photoluminescence quantum yield at a second pH within the chemical or biological environment, wherein the first pH and the second pH differ by 0.5 or less, and wherein the first photoluminescence quantum yield and the second photoluminescence quantum yield differ by at least 5%; or
the fluorophore has a first fluorescence lifetime at a first pH within the chemical or biological environment and a second fluorescence lifetime at a second pH within the chemical or biological environment, wherein the first pH and the second pH differ by 2 or less, and wherein the first fluorescence lifetime and the second fluorescence lifetime differ by at least 1 ns.

6. The method of claim 1, wherein the chemical species comprising a primary amine moiety further comprises a thiol moiety.

7. The method of claim 1, wherein the fluorophore comprises a dioxo-pyridine ring (DPR) or a thiazolopyridine acid (TPA).

8. The method of claim 1, wherein the fluorophore is part of a macromolecule.

9. The method of claim 1, wherein the luminescent reaction product comprises a conjugated ring and the conjugated ring includes one or more electron withdrawing group substituents and/or one or more electron donating group substituents.

10. The method of 1, wherein:
the fluorophore exhibits an isosbestic point or isosbestic region as a function of pH;
the fluorophore further exhibits a decrease in peak emission intensity and/or photoluminescence quantum yield as a function of pH;
the fluorophore is a ratiometric pH sensor based on a ratio between the isosbestic point or isosbestic region and the peak emission intensity and/or photoluminescence quantum yield; and
the fluorophore is a ratiometric pH sensor from pH 3 to pH 4.5 with an accuracy of ±0.1 pH units.

11. The method of claim 1, wherein the analyte comprises hydrogen ions and halide ions.

12. The method of claim 11, wherein the fluorophore exhibits a first spectroscopic change in response to hydrogen ion concentration and a second spectroscopic change in response to the presence of halide ions.

13. The method of claim 1, wherein the analyte comprises halide ions.

14. The method of claim 1, wherein the fluorophore is attached to or immobilized in a polymer or hydrogel, the environment is a solid state environment, and the method senses the analyte in real-time.

15. The method of claim 1, wherein the halogens comprise chlorine and bromine.

16. The method of claim 1, wherein the organic solvent comprises acetone, dioxane, or dichloromethane.

17. The method of claim 1, wherein the fluorophore is selected from citric acid ("CAS")-Cys, CA-Cysteamine, CA-Homocysteine, CA-Penicillamine, CA-Ala, CA-Gly, CA-Propylamine, CA-Allylamine, CA-Methyl-Serine, and CA-Ethanolamine.

* * * * *

UNITED STATES PATENT AND TRADEMARK OFFICE
CERTIFICATE OF CORRECTION

PATENT NO. : 10,648,917 B2
APPLICATION NO. : 15/564561
DATED : May 12, 2020
INVENTOR(S) : Jian Yang et al.

Page 1 of 1

It is certified that error appears in the above-identified patent and that said Letters Patent is hereby corrected as shown below:

In the Specification

Column 50, Line 41 " $\frac{I_O}{I_{pH3.8}}$ " should read " $\frac{I_O}{I_{pH\,0.8}}$ ", In the Claims Column 53, Line 4 Claim 17 "citric acid ("CAS"-Cys)" should read "citric acid ("CA")-Cys".

Signed and Sealed this
Eighteenth Day of August, 2020

Andrei Iancu
*Director of the United States Patent and Trademark Office*